United States Patent
Strobl et al.

(10) Patent No.: US 9,961,580 B2
(45) Date of Patent: May 1, 2018

(54) MOBILE TERMINAL DEVICES AND METHODS OF PERFORMING RADIO MEASUREMENTS

(71) Applicant: Intel IP Corporation, Santa Clara, CA (US)

(72) Inventors: Stefan Strobl, Obermichelbach (DE); Stefan Mager, Nuremberg (DE); Dietmar Gradl, Ebersberg (DE); Ajay Panchal, Manalapan, NJ (US); Yang Tang, Pleasanton, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 48 days.

(21) Appl. No.: 14/751,177

(22) Filed: Jun. 26, 2015

(65) Prior Publication Data

US 2016/0381588 A1 Dec. 29, 2016

(51) Int. Cl.
*H04B 17/00* (2015.01)
*H04W 24/10* (2009.01)
(Continued)

(52) U.S. Cl.
CPC ............. *H04W 24/10* (2013.01); *H04W 4/06* (2013.01); *H04W 36/0088* (2013.01); *H04W 76/002* (2013.01)

(58) Field of Classification Search
CPC .... H04W 24/00; H04W 24/10; H04W 72/005
(Continued)

(56) References Cited

U.S. PATENT DOCUMENTS

| 2008/0170557 | A1 | 7/2008 | Yin |
| 2013/0155881 | A1 | 6/2013 | Amerga et al. |
| 2015/0289141 | A1* | 10/2015 | Ghasemzadeh ....... H04W 16/14 370/330 |

FOREIGN PATENT DOCUMENTS

| EP | 2296422 A1 | 3/2011 |
| KR | 1020080054865 A | 6/2008 |

(Continued)

OTHER PUBLICATIONS

Kapila, "Multimedia Broadcasting in Long Term Evolution Networks", Tata Consultancy Services White Papers, http://www.tcs.com/SiteCollectionDocuments/White%20Papers/Telecom-Whitepaper-Multimedia-Broadcasting-LTE-Networks-05 accessed on May 25, 2015, 14 pages.
(Continued)

*Primary Examiner* — Eugene Yun
(74) *Attorney, Agent, or Firm* — Viering, Jentschura & Partner mbB

(57) ABSTRACT

A mobile terminal device includes a processing circuit and a receiver circuit. The processing circuit is configured to determine if a multimedia data stream associated with a mobile communication network is received, identify a set of reception timing occasions of the multimedia data stream, and calculate an alternate radio measurement schedule based on the set of reception timing occasions. The receiver circuit is configured to receive the multimedia data stream and perform one or more radio measurements according to the alternate radio measurement schedule if the multimedia data stream is received while the mobile terminal device is in an idle radio connection state, and perform one or more radio measurements according to a default radio measurement schedule if no multimedia data stream is received while the mobile terminal device is in the idle radio connection state.

20 Claims, 5 Drawing Sheets

(51) Int. Cl.
  *H04W 4/06* (2009.01)
  *H04W 36/00* (2009.01)
  *H04W 76/00* (2018.01)
(58) Field of Classification Search
  USPC ...................................................... 455/67.11
  See application file for complete search history.

(56) References Cited

FOREIGN PATENT DOCUMENTS

| KR | 1020090099086 A | 9/2009 |
|---|---|---|
| KR | 1020100050518 A | 5/2010 |
| WO | 2008072912 A1 | 6/2008 |
| WO | 2008085952 A1 | 7/2008 |
| WO | 2009014248 A1 | 1/2009 |

OTHER PUBLICATIONS

Roessler, "evolved MBMS broadcast and multicast in LTE", http://www.slideshare.net/zahidtg/embms-broadcast-and-multicast-in-lte, Aug. 2011, 35pages.
Huawei, "Measurements and MCCH reception in idle, CELL_PCH and URA_PCH", 3GPP DRAFT; R4-051213, 3rd Generation Partnership Project (3GPP); Nov. 2005.
Extended European Search Report received for corresponding EP Application No. 16171189.0 dated Oct. 24, 2016, 11 pages.
Korean Office Action based on application No. 1020160064262 (2 pages and 1 page of English translation) dated Mar. 6, 2018.

\* cited by examiner

MOBILE TERMINAL DEVICES AND METHODS OF PERFORMING RADIO MEASUREMENTS

TECHNICAL FIELD

Various embodiments relate generally to mobile terminal devices and methods of performing radio measurements.

BACKGROUND

Mobile terminals operating according to Third Generation Partnership Project (3GPP) standards may be required to continuously perform radio measurements of various access points in a wireless communication network, such as radio measurements on signals received from a serving cell or one or more neighboring cells. The radio measurements may be required in both connected modes of operation (such as RRC_Connected mode in a Long Term Evolution (LTE) configuration or CELL_DCH mode in a Universal Mobile Telecommunications Systems (UMTS) configuration), where the mobile terminal has an active two-way connection with the wireless communication network, and idle modes of operation (such as RRC_Idle mode in an LTE configuration or CELL_PCH mode in a UMTS configuration), where the mobile terminal is substantially only receiving basic information (such as e.g. limited control and/or paging information) from the wireless communication network.

Mobile terminals may be required to perform intra-frequency, inter-frequency, and inter-RAT (Radio Access Technology) measurements in both connected and idle modes. As inter-frequency and inter-RAT measurements may require substantial adjustment in operation for reception of wireless signals, a single-receiver mobile terminal may not be able to continue receiving downlink information during inter-frequency and inter-RAT measurements. Accordingly, measurement gap patterns may be provided in order to allocate use of the receiver between downlink reception and radio measurement over time.

3GPP has specified such measurement gap patterns for use in both connected mode and idle mode. In RRC_Idle mode in an LTE configuration, a mobile terminal may implement a DRX (Discontinuous Reception Cycle) cycle during which downlink reception is suspended for relatively lengthy continuous intervals of time to allow inter-frequency and inter-RAT measurements to be performed. In RRC_Connected mode, a mobile terminal may implement a measurement gap pattern, during which inter-frequency and inter-RAT measurements are accomplished by temporarily suspending downlink reception to according to a set period in order to perform relatively short radio measurements.

A mobile terminal may thus be able to maintain sufficient downlink reception for conventional unicast data traffic in both connected mode and idle mode by performing radio measurements according to a respective DRX cycle or measurement gap pattern.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
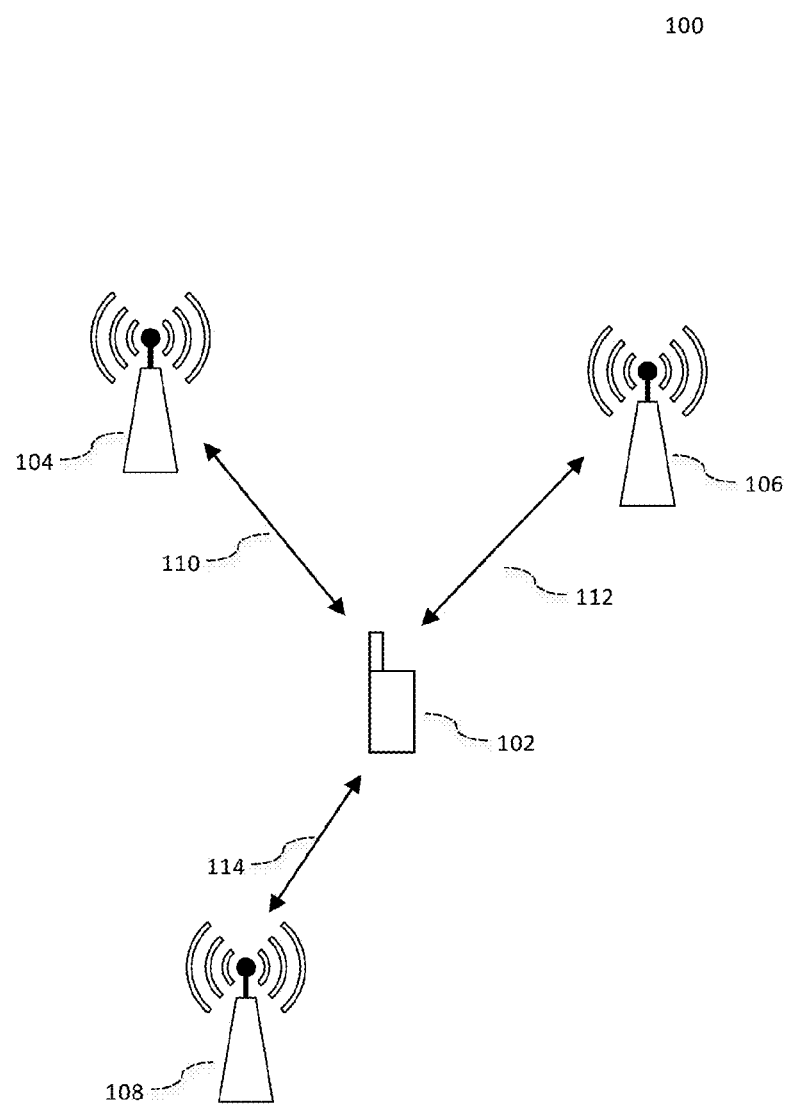
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, i.e. including a 1×1 vector (e.g. a scalar), an 1×M vector (e.g. a row vector), and an M×1 vector (e.g. a column vector). Similarly, it is appreciated that references to a "matrix" may refer to matrix of any size or orientation, i.e. including a 1×1 matrix (e.g. a scalar), a 1×M matrix (e.g. a row vector), and a M×1 matrix (e.g. a column vector).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

The term "base station" used in reference to an access point of a mobile communication network may be understood as a macro base station, micro base station, Node B, evolved NodeBs (eNB), Home eNodeB, Remote Radio Head (RRHs), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

A mobile terminal operating according to a Long Term Evolution (LTE) configuration as specified by the Third Generation Partnership Project (3GPP) may be required to continuously perform radio measurements, which may be utilized to control mobility procedures including handover and cell selection/reselection. Accordingly, it is critical that a mobile terminal be able to complete the requisite radio measurements.

Mobile terminals may be required to perform intra-frequency, inter-frequency, and inter-RAT (Radio Access Technology) measurements. Inter-frequency and inter-RAT measurements may require significant adjustment of the receiver in a mobile terminal, and accordingly it may not be possible for a single receiver mobile terminal to simultaneously perform such inter-frequency and inter-RAT measurements while continuing conventional unicast data operation. For example, a single receiver mobile terminal may not be able to continue to receive unicast data on channel associated with a first carrier frequency while simultaneously performing radio measurements on a channel associated with a second carrier frequency, and likewise for a first and second radio access technology. Accordingly, single receiver mobile terminals may need to implement special procedures that allocate time and frequency resources in order to perform both unicast data communications and the requisite radio measurements. A single receiver mobile terminal may need to periodically suspend unicast data communications in order to utilize the receiver to perform the requisite radio measurements.

Single receiver mobile terminals may therefore conventionally perform radio measurements according to either a DRX (Discontinuous Reception) cycle or a measurement gap pattern in RRC_Idle and RRC_Connected modes, respectively, while operating on an LTE network. DRX cycles and measurement gap patterns may be implemented as a way to complete these radio measurements while maintaining sufficient exchange of downlink and/or uplink data (i.e. unicast data).

In RRC_Idle mode, a mobile terminal may only receive limited unicast data, such as e.g. paging and/or control information. For example, a mobile terminal in RRC_Idle mode may not transmit uplink data to a wireless communication network, and instead may only receive essential certain downlink control and paging information. As the reception of such downlink control and paging information may be completed in a short duration of time, the receiver of the mobile terminal may have substantial periods of time during which no downlink reception from the network is required. The mobile terminal may accordingly de-activate the receiver during these periods of time in order to save power, such as by entering a low-power or sleep state. Alternatively, as the mobile terminal may not need to receive further downlink information, the mobile terminal may perform radio measurements during the remaining time in the DRX cycle. The length of an implemented DRX cycle may be specified by the network, and may be a value such as e.g. 32, 64, 128, 256 ms, etc. Mobile terminals may also be configured with extended DRX cycles, such as 32, 64, 128, 256 radio frames, etc., where a radio frame is 10 ms in duration. Over the course of a DRX cycle, a mobile terminal may need to monitor a single 1 ms subframe in a single radio frame for paging information, and may be able to utilize the remaining time in the DRX cycle to perform intra-frequency, inter-frequency, and inter-RAT measurements (assuming no paging information requiring further action is received).

In contrast to RRC_Idle mode, a mobile terminal in RRC_Connected mode may exchange substantial data over both downlink and uplink channels, i.e. unicast data, with an LTE network. Accordingly, it may not be practical to suspend such unicast data for extended periods of time (e.g. as in DRX cycles for RRC_Idle mode) in order to perform measurements, as this may lead to unacceptably low data rates and/or data loss. A mobile terminal in RRC_Connected mode may instead temporarily suspend unicast data exchange for a relatively short duration of time, such as e.g. 6 ms (i.e. 6 subframes), to perform measurements before resuming unicast data exchange. The mobile terminal may utilize the 6 ms "gap" in order to perform inter-frequency and inter-RAT measurements, and may return to unicast transmission and/or reception following completion of the measurement gap. The gaps may occur according to a specified period, such as e.g. 40 or 80 ms. The starting time point (i.e. gap offset), gap length, and gap periodicity may substantially define the measurement gap pattern utilized by a mobile terminal in RRC_Connected mode to complete inter-frequency and inter-RAT measurements.

A single receiver mobile terminal may be able to maintain sufficient unicast data transmission and reception in conventional use cases in accordance with RRC_Connected and RRC_Idle modes by implementing measurement gap patterns and DRX cycles, respectively. For example, a mobile terminal in a conventional RRC_Idle mode use case may not be engaged in mobile activities that require a high amount of unicast data exchange, and accordingly a mobile terminal may merely monitor for paging information during certain occasional subframes, and may not need to receive any further data until a later active session is engaged.

However, the recent introduction of evolved Multimedia Broadcast Multicast Services (eMBMS), which utilize the same time and frequency resources as unicast data transmission, has resulted in use cases having substantial timing conflicts with the existing measurement protocols, particularly with radio measurements in DRX cycles. Up to six subframes in a given downlink radio frame may be allocated as a Multicast-Broadcast Single-Frequency Network (MBSFN) subframes that contain MBSFN data, where multiple consecutive and/or periodic radio frames may contain such MBSFN subframes. As these MBSFN subframes utilize the same time and frequency resources as conventional unicast transmissions, the reception of eMBMS data may place significant constraints on the ability of a single receiver mobile terminal to perform the requisite radio measurements without sacrificing the quality of eMBMS data reception.

For example, while mobile terminals in a conventional RRC_Idle mode use case may only need to receive occasional paging information, a mobile terminal with an active eMBMS session (i.e. actively receiving an eMBMS stream) may need to receive eMBMS data in up to six subframes in one or more successive radio frames, such as e.g. four radio frames in a row. Accordingly, the existing DRX cycle measurement procedures, where downlink data reception is suspended for extended durations of time in favor of inter-frequency and inter-RAT measurements, may no longer be practical for single receiver mobile terminals with an active eMBMS session.

A mobile terminal in RRC_Idle may only be required to monitor for paging information in a single radio frame (i.e. paging frame) over a single DRX cycle, and may e.g. de-activate the receiver or perform radio measurements during the remaining time in the DRX cycle, e.g. for non-paging DRX radio frames. For example, a mobile terminal may be provided with a DRX cycle length of 64 radio frames=640 ms. The mobile terminal may therefore be required to monitor one paging frame during each 640 ms period for paging information. Assuming no paging message is indicated by a paging indicator contained in the paging frame, the mobile terminal may suspend downlink data reception for the remaining 63 non-paging DRX radio frames in the DRX cycle.

As previously mentioned, the remaining duration of time in the DRX cycle, i.e. each of the non-paging DRX radio frames, may be allocated to a low-power "sleep" mode or to radio measurements, which the mobile terminal may be required to periodically perform in order to meet performance requirements specified by 3GPP.

Accordingly, a mobile terminal in RRC_Idle mode performing measurements according to a DRX cycle may utilize the duration of time directly following a paging frame to perform intra-frequency measurements, which may not require significant reception adjustment in the receiver. The mobile terminal may then utilize the remaining radio frames in the DRX cycle to perform inter-frequency and inter-RAT measurements. For example, the mobile terminal may perform measurements on cell utilizing different carrier frequencies or yield control to a legacy RAT, such as Global System for Mobile Communications (GSM) or Universal Mobile Telecommunication Systems (UMTS), in order to allow for measurement of cells operating according to a legacy RAT.

However, the remaining non-paging DRX radio frames conventionally utilized for inter-frequency and inter-RAT measurements may directly collide with radio frames containing eMBMS data, i.e. MBSFN subframes containing eMBMS data. A mobile terminal may thus be receiving an eMBMS stream associated with a particular MBSFN area while in RRC_Idle mode, where the associated eMBMS data may be contained in up to six subframes in a given sequence of radio frames.

Accordingly, performing inter-frequency and/or inter-RAT measurements during the radio frames allocated by conventional DRX cycle measurement procedures with a single receiver will result in the loss of multiple MBSFN subframes in a row, as reception of the eMBMS data contained in the MBSFN subframes will be suspended in favor of performing inter-frequency and inter-RAT measurements. The reception quality of the eMBMS service will thus decrease significantly due to the durations of lost eMBMS data, which may be too prolonged to be effectively compensated for by downlink decoders in the mobile terminal.

The use of DRX cycle measurement procedures may therefore result in significant data loss in an eMBMS stream being received by a single receiver mobile terminal in RRC_Idle mode. This data loss may be reflected in reception of both the MBMS Control Channel (MCCH) and MBMS Traffic Channel (MTCH), which may both be located within the aforementioned MBSFN subframes. The utilization of non-paging DRX radio frames for radio measurements may result in collisions with reception of MCCH and/or MTCH data, both of which may contribute significantly to the degradation of eMBMS reception quality.

As the allocation of extended continuous durations of time for inter-frequency and inter-RAT measurements may directly result in the loss of MCCH and/or MTCH data contained in multiple MBSFN subframes, the existing DRX cycle measurement procedures may be sub-optimal for single receiver mobile terminals receiving eMBMS data streams.

There exist certain eMBMS use cases that may warrant differing solutions caused by the eMBMS data loss problem associated with existing DRX cycle measurement procedures. Specifically, it may be possible for a single receiver mobile terminal to predominantly follow a DRX cycle measurement procedure when only MCCH data is being received, although adjustments in time and/or short suspension of measurements may be required. Alternatively, a single receiver mobile terminal may adopt a measurement gap pattern similar to the measurement gap patterns utilized by mobile terminals in RRC_Connected in order to facilitate reception of MTCH data in a largely simultaneous manner as to the requisite radio measurements.

Specifically, a mobile terminal engaged in an active eMBMS session may be either receiving only MCCH data or both MCCH and MTCH data as part of the Multicast Channel (MCH), which is the transport channel to which the MCCH and the MTCH are multiplexed onto. Unlike MTCH data, which may be allocated into a relatively unpredictable number and distribution of MBSFN subframes, MCCH data may occur according to a largely deterministic, periodic distance. Accordingly, the occurrence of MCCH data may be predictable in time. Additionally, the distribution of MCCH data may be sparse in time comparable to MTCH data.

Consequently, due to the predictive nature and sparse distribution of MCCH data over time, a mobile terminal in RRC_Idle that is only receiving MCCH data may perform measurements predominantly according to a DRX cycle measurement procedure. Timing adjustments and/or temporary suspension of radio measurements may then be utilized in order to adjust the existing DRX cycle measurement procedure in order to receive MCCH data.

FIG. 1 shows mobile communication network 100. Mobile communication network 100 may be configured according to an LTE network standard. However, it is appreciated that the disclosure included herein may be expanded and/or applied to any number of various wireless communication networks, such as GSM or UMTS.

User Equipment (UE) 102 may receive wireless radio signals from enhanced nodeBs (eNBs) 104-108 over respective air interfaces 110-112. Air interfaces 110-112 may comprise one or more physical communication channels, such as e.g. a unique communication channel associated with each cell of eNBs 104-108 (not explicitly shown in FIG. 1). Accordingly, UE 102 may be configured to perform uplink and/or downlink communications with the one or more cells associated with eNBs 104-108 over the unique communication channels contained in air interfaces 110-112.

Each of eNBs 104-108 may each be part of a radio access network of mobile communication network 100, and may each be connected with an underlying core network of mobile communication network 100. Accordingly, eNBs 104-108 may allow UE 102 to exchange data with the underlying core network of mobile communication network 100 through air interfaces 110-112.

UE 102 may be a single receiver device, and accordingly may not be able to receive wireless radio signals at a plurality of substantially different carrier frequencies. In an exemplary scenario, UE 102 be in an idle state, and accordingly may be in RRC_Idle mode. UE 102 may therefore not have a dedicated uplink channel with the radio access network of mobile communication network 100, and may only be configured to receive paging information according to a DRX cycle specified by mobile communication network 100. UE 102 may currently have a serving cell, such as e.g. a first cell located at eNB 104. UE 102 may monitor downlink paging information transmitted by the first cell of eNB 104 for the presence of potential paging indicators designated for UE 102 during a specified paging frame. However, UE 102 may not be required to receive further downlink data from the first cell of eNB 104.

UE 102 may therefore be configured to utilize one or more of the remaining non-paging DRX radio frames to perform inter-frequency and/or inter-RAT measurements. As UE 102 may be a single receiver device, UE 102 may only be capable of receiving wireless radio signals on the same carrier frequency or associated with the same RAT during the same time as any inter-frequency or inter-RAT measurements, respectively. As UE 102 may be configured with LTE as the master RAT (i.e. the first cell of eNB 104 is an LTE cell), the inter-RAT measurements may include GSM and/or UMTS radio measurements. Accordingly, UE 102 may be configured to perform radio measurements on one or more cells of eNBs 104-108 during the remaining non-paging DRX radio frames, such as measurements on cells having a different carrier frequency than the first cell of eNB 104 and cells operating according to GSM and/or UMTS configurations. It is appreciated that intra-frequency measurements performed on cells having the same carrier frequency as the first cell of eNB 104 may be performed concurrently as reception of other downlink information from the first cell of eNB 104, such as reception of paging information and/or reception of eMBMS data including both MCCH and MTCH data.

However, UE 102 may be receiving eMBMS data during MBFSFN subframes that conflict with the non-paging DRX cycle subframes. For example, the first cell of eNB 104 may be configured to provide an eMBMS data stream as part of an MBFSFN area. Accordingly, UE 102 may receive eMBMS data during specified MBSFN subframes from the first cell of eNB 104. Due to the extended duration of the non-paging DRX cycle frames, one or more of the MBSFN subframes may collide with a non-paging DRX cycle frame that UE 102 has allocated for inter-frequency or inter-RAT measurement. Accordingly, UE 102 may not be able to receive the colliding MBSFN subframe as the inter-frequency or inter-RAT measurement required by mobile communication network 100 may be performed instead.

In a first exemplary scenario, UE 102 may only be receiving MCCH data during the colliding MBSFN subframes. As previously detailed, MCCH data may be relatively predictable (e.g. periodic) and sparsely distributed in time.

Figure 2:
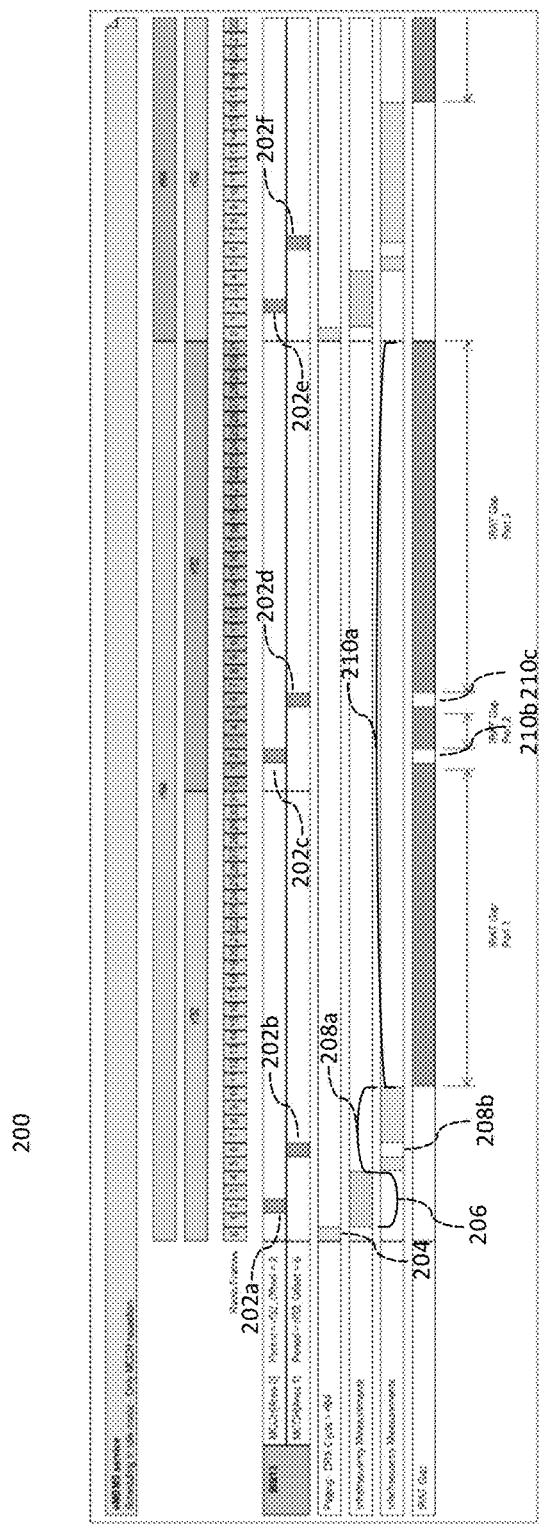
FIG. 2 shows a first exemplary radio frame sequence containing MBSFN data.

FIG. 2 depicts radio frame sequence 200. Radio frame sequence 200 illustrates an exemplary measurement pattern appropriate for single receiver mobile terminals, such as UE 102, in RRC_Idle mode receiving eMBMS data containing only MCCH data. Accordingly, UE 102 may receive only MCCH data, and may not receive any MTCH data.

As depicted by radio frame sequence 200, UE 102 may be configured with a DRX cycle length of 64 frames, with the DRX cycle beginning at radio frame 0 (RF0) as configured by a DRX cycle offset. The DRX cycle schedule utilized by UE 102 may be e.g. specified by mobile communication network 100. Accordingly, radio frame sequence 200 may illustrate two DRX cycles of UE 102, i.e. the entire 64 radio frames RF0-RF63 of the first DRX cycle of UE 102 and the first radio 23 radio frames RF0-RF22 of the second DRX cycle of UE 102. Each of radio frames RF0-RF63 of the first DRX cycle of UE 102 and the first radio 23 radio frames RF0-RF22 of the second DRX cycle of UE 102 may additionally correspond to a System Frame Number (SFN).

It is appreciated that the exemplary DRX cycles detailed regarding radio frame sequence 200 may be periodic in nature, and accordingly may occur in substantially the same manner and/or schedule for a duration of time following RF22 of the second DRX cycle of UE 102, such as e.g. at least until the completion of the second DRX cycle of UE 102. It is further appreciated that the DRX cycle schedule detailed regarding the first and second DRX cycles of UE 102 may repeat for an extended period of time following the completion of the second DRX cycle of UE 102.

Accordingly, UE 102 may be configured to receive paging information during RF0 of the first DRX cycle, i.e. RF0 may be the paging frame assigned to UE 102. After receiving an appropriate paging indicator in RF0, UE 102 may determine that the paging indicator does not indicate that UE 102 should receive further paging information. UE 102 may thus remain in RRC_Idle mode following the conclusion of RF0. As the remaining radio frames RF1-RF63 in the first DRX cycle are not allocated to the reception of paging information, UE 102 may be configured to utilize these remaining non-paging DRX radio frames RF1-RF63 to perform radio measurements, such as intra-frequency, inter-frequency, and inter-RAT measurements.

However, in contrast to a conventional use case in which UE 102 is receiving only basic downlink information (such as e.g. paging information) in RRC_Idle mode, UE 102 may also be receiving MCCH data associated with MBSFN Area 0 and MBSFN Area 1, denoted in FIG. 2 as MBSFN Area 0 MCCH windows 202a, 202c, and 202e and MBSFN Area 1 MCCH windows 202b, 202d, and 202f in FIG. 2.

Similarly to the scenario detailed regarding FIG. 1, UE 102 may be receiving an eMBMS data stream from a first cell of eNB 104. Accordingly, the first cell of eNB 104 may be designated as part of MBSFN Area 0, and thus may transmit eMBMS data associated with a first eMBMS data stream unique to MBSFN Area 0.

The first eMBMS data stream associated with MBSFN Area 0 may be not contain any eMBMS user data traffic, and accordingly may not contain any MTCH data. The first eMBMS stream may therefore contain only MBSFN Area 0 MCCH data. UE 102 may need to receive the MBSFN Area 1 MCCH data during certain scheduled radio frames and subframes, which may be specified by mobile communication network 100 through control signalling. As depicted in FIG. 2, UE 102 may need to receive MBSFN Area 0 MCCH data during MBSFN Area 0 MCCH windows 202a, 202c, and 202e, which occur at radio frames RF2 and RF34 of the first DRX cycle and RF2 of the second DRX cycle.

It is appreciated that a mobile terminal may only be required to be able to support one eMBMS data stream. Accordingly, the disclosure detailed herein may be applied to substantially all situations in which a mobile terminal is receiving a single eMBMS data stream, i.e. eMBMS data from a single MBSFN area. However, it may be possible for mobile terminals to receive eMBMS data streams from more than one MBSFN area.

UE 102 may therefore additionally be receiving a second eMBMS data stream, such as e.g. from the first cell of eNB 104. Accordingly, the first cell of eNB 104 may be designated as part of MBSFN Area 0 and MBSFN Area 1, and accordingly may transmit the first eMBMS data stream associated with MBSFN Area 0 and MBSFN Area 1. It is appreciated that UE 102 may alternatively receive the second eMBMS data stream from another cell of eNBs 104-108, which may be accordingly be designated as part of MBSFN Area 1.

The first cell of eNB 104 may therefore transmit eMBMS data associated with the second eMBMS data stream of MBSFN Area 1. Similarly to as detailed regarding the first eMBMS data stream, UE 102 may need to receive the MBSFN Area 1 MCCH data during certain scheduled radio frames and subframes, which may specified by mobile communication network 100 through control signalling. As depicted in FIG. 2, UE 102 may need to receive MBSFN Area 1 MCCH data during MBSFN Area 1 MCCH windows 202b, 202d, and 202f, which occur at radio frames RF6 and RF38 of the first DRX cycle and RF6 of the second DRX cycle.

MCCH data associated with MBSFN Area 0 and MBSFN Area 1 may be transmitted in a largely repetitive manner. As indicated in radio frame sequence 200, MBSFN Area 0 MCCH data and MBSFN Area 1 MCCH data may be transmitted with a repetition period of rf32 radio frames, where MBSFN Area 0 MCCH data and MBSFN Area 1 MCCH data have a radio frame offset of 2 and 6 radio frames, respectively. UE 102 may obtain this information from System Information Block 13 (SIB13) which may be periodically transmitted by the first cell of eNB 104. SIB13 may provide UE 102 with information regarding the MCCH for all MBSFN areas that the first cell of eNB 104 is associated with, such as MBSFN Area 0 and MBSFN Area 1.

It is appreciated that the MCCH repetition period and MCCH offset may be different values other than the exemplary values given herein, such as e.g. rf64, rf128, rf256, etc., for the MCCH repetition period or 1, 2, 3, etc., for the MCCH offset. Accordingly, this disclosure is intended to be demonstrative in nature, and it is appreciated that the implementation detailed herein may be adjusted to accommodate for substantially any combination of MCCH repetition periods and MCCH offsets.

SIB13 may provide UE 102 with the repetition period, e.g. rf32, and offset, e.g. 2 and 6, for the related MCCH data. UE 102 may therefore be able to identify a corresponding radio frame that will contain MCCH data for MBSFN Area 0 and MBSFN Area 1. SIB13 may additionally specify which subframe within the corresponding radio frame the MCCH data will be located within, thereby assisting UE 102 to determine the exact subframe location of the MCCH data for MBSFN Area 0 and MBSFN Area 1.

Based on the MCCH radio frame and subframe information provided by SIB13, UE 102 may be able to identify MBSFN Area 0 MCCH windows 202a, 202c, and 202e and MBSFN Area 1 MCCH windows 202b, 202d, and 202f as the appropriate radio frame locations where the requisite MCCH data is located. Although not explicitly depicted in FIG. 2, UE 102 may additionally be able to identify the subframe within each radio frame that the desired MCCH data is located.

Accordingly, UE 102 may identify radio frames during which MCCH data must be received, i.e. MBSFN Area 0 MCCH windows 202a, 202c, and 202e and MBSFN Area 1 MCCH windows 202b, 202d, and 202f located in radio frames RF2, RF6, RF34, and RF38 of the first DRX cycle and radio frames RF2 and RF6 of the second DRX cycle as depicted in FIG. 2. It is appreciated that the location of MCCH data may continue to repeat for the remainder of the second DRX cycle and for further DRX cycles due to the periodicity of MCCH data.

In addition to the periodic nature of MCCH data, MCCH data for each MBSFN area may only be transmitted during a single radio frame during a given MCCH repetition period. The MCCH data may only be transmitted in a single subframe during the single radio frame, and accordingly MCCH data may be relatively sparsely distributed.

However, MBSFN Area 0 MCCH windows 202a, 202c, and 202e and MBSFN Area 1 MCCH windows 202b, 202d, and 202f may fall within the non-paging DRX radio frames RF1-RF63 of the first DRX cycle shown in radio frame sequence 200 and non-paging DRX radio frames RF1-RF63 of the second DRX cycle. As these non-paging DRX radio frames may be utilized by UE 102 for radio measurements (i.e. intra-frequency measurements, inter-frequency measurements, and inter-RAT measurements), there may exist scheduling collisions between the reception of MCCH data and radio measurements.

UE 102 may be required to perform radio measurements that meet certain performance requirements, and accordingly it may not be possible for UE 102 to forego or skip all of the radio measurements in order to receive MCCH data during MBSFN Area 0 MCCH windows 202a, 202c, and 202e and MBSFN Area 1 MCCH windows 202b, 202d, and 202f. However, due to the relatively predictable and sparse temporal distribution of MCCH data, UE 102 may be able to briefly interrupt radio measurements in order to receive MCCH data only during necessary time periods such as MBSFN Area 0 MCCH windows 202a, 202c, and 202e and MBSFN Area 1 MCCH windows 202b, 202d, and 202f, i.e. during radio frames RF2, RF6, RF34, and RF38 of the first DRX cycle of UE 102, RF2 and RF6 of the second DRX cycle of UE 102, and any further radio frames extending beyond the range of radio frame sequence 200 that contain additional MCCH data.

Accordingly, UE 102 may be configured to perform intra-frequency measurements during intra-frequency measurement window 206 according to a default DRX measurement configuration. UE 102 may be configured to perform inter-frequency measurements during inter-frequency measurement window 208a. UE 102 may be configured to perform inter-RAT measurements during inter-RAT measurement window 210a. The aforementioned order of radio measurement windows may represent a conventional use case, as it may be practical for a mobile terminal in RRC_Idle performing DRX radio measurements to perform intra-frequency measurements immediately following a paging frame. The mobile terminal may then proceed to perform inter-frequency and inter-RAT measurements in the remaining duration of the DRX cycle, as the inter-frequency and particularly the inter-RAT measurements may require extensive durations of time.

As shown in FIG. 2, the radio frames constituting intra-frequency measurement window 206, inter-frequency measurement window 208a, and inter-RAT measurement window 210a may directly conflict with the radio frames associated with MBSFN Area 0 MCCH windows 202a, 202c, and 202e and MBSFN Area 1 MCCH windows 202b, 202d, and 202f.

In order to mitigate this problem, UE 102 may be configured to interrupt radio measurements during certain measurement windows.

For example, UE 102 may be configured to interrupt inter-frequency and inter-RAT measurements in inter-frequency measurement window 208a and inter-RAT measurement window 210a if a conflict exists with scheduled reception of MCCH data. It is appreciated that intra-frequency measurements, such as the intra-frequency measurements performed in intra-frequency measurement window 206 during RF1-RF4 of the first DRX cycle of UE 102, may be able to be performed concurrently with reception of MCCH data, such as with the reception of MBSFN Area 0 MCCH data in MBSFN Area 0 MCCH window 202a in RF2.

Accordingly, MCCH data reception in MBSFN Area 0 MCCH window 202a may be performed simultaneous to intra-frequency measurements in intra-frequency measurement window 206, as the receiver of UE 102 may not need any substantial adjustment in order to simultaneously receive MCCH data and radio signals for measurement using the same carrier frequency. UE 102 may therefore receive MBSFN Area 0 MCCH data in MBSFN Area 0 MCCH window 202a in RF2 while performing intra-frequency measurements in intra-frequency measurement window 206. Accordingly, no interruption of radio measurements to receive MCCH data may be required.

However, as UE 102 may only be configured with a single receiver, it may not be possible for UE 102 to perform inter-frequency measurements during inter-frequency measurement window 208a concurrently to receiving MCCH data in MBSFN Area 1 MCCH window 202b. As shown in FIG. 200, there may exist a direct timing conflict in RF6.

UE 102 may therefore briefly interrupt inter-frequency measurements in RF6 for inter-frequency measurement suspension window 208b during inter-frequency measurement window 208a in order to receive MCCH data in MBSFN Area 1 MCCH window 202b. Accordingly, UE 102 may temporarily suspend inter-frequency measurements during inter-frequency measurement suspension window 208b in order to switch the reception frequency of the receiver in order to receive the MCCH data for the second eMBMS data stream associated with MBSFN Area 0 from the first cell of eNB 106. UE 102 may therefore adjust the reception frequency of the receiver in order to receive MCCH data from the first cell of eNB 106, which as previously described may be transmitting the MBSFN Area 1 MCCH data.

After receiving the MBSFN Area 1 MCCH data, UE 102 may return to performing the inter-frequency measurements of inter-frequency measurement window 208a. It is appreciated that such a suspension of radio measurements during performance thereof may require a delay in the radio measurements or acceptance of inaccuracy of the radio measurements.

After completing inter-frequency measurements in inter-frequency measurement window 208a, UE 102 may proceed to perform inter-RAT measurements during inter-RAT measurement window 210a. As LTE may be the master RAT, the inter-RAT measurements may be GSM and UMTS measurements. As shown in FIG. 2, the inter-RAT measurements may require an extensive duration of time to complete, which may be related to certain performance requirements specified by 3GPP with respect to inter-RAT measurements. Inter-RAT measurement window 210a may therefore be allotted the remaining duration of the first DRX cycle of UE 102, i.e. the all of non-paging DRX radio frames RF11-RF63, during which UE 102 may perform the requisite legacy RAT measurements for GSM and UMTS.

Accordingly, it may be likely that inter-RAT measurement window 210a will conflict with one or more radio frames where MBSFN Area 0 or MBSFN Area 1 MCCH data is scheduled to be received. Similarly to as detailed regarding inter-frequency measurement window 208a, it may not be possible for UE 102 to receive MCCH data simultaneous to performing inter-RAT measurements.

As depicted in FIG. 2, UE 102 may therefore temporarily suspend inter-RAT measurements during inter-RAT measurement window 210a in order to receive scheduled MCCH data. UE 102 may then receive the scheduled MCCH data for MBSFN Area 0 and MBSFN Area 1 during the temporary suspension of inter-RAT measurements, and proceed to complete the inter-RAT measurements after the temporary radio measurement suspension in addition to any further temporary radio measurement suspensions.

Specifically, as shown in FIG. 2, MBSFN Area 0 MCCH window 202c and MBSFN Area 1 MCCH window 202d may conflict with inter-RAT measurement window 210a. UE 102 may therefore suspend inter-RAT measurements during inter-RAT measurement suspension window 210b and inter-RAT measurement suspension window 210c in order to receive MCCH data in MBSFN Area 0 MCCH window 202c and MBSFN Area 1 MCCH window 202d, respectively. In the remaining time in inter-RAT measurement window 210a other than inter-RAT measurement suspension window 210b and inter-RAT measurement suspension window 210c, UE 102 may perform inter-RAT measurements, such as e.g. by allowing legacy RATs to utilize the receiver of UE 102 to perform measurements on GSM and UMTS. Similarly to as indicated regarding inter-frequency measurement suspension window 210c, it is appreciated that such a suspension of radio measurements during performance thereof may require a delay in the radio measurements or acceptance of inaccuracy of the radio measurements.

UE 102 may therefore maintain reception of MCCH data for both eMBMS stream associated with MBSFN Area 0 and MBSFN Area 1 through the use of radio measurement suspension windows such as inter-frequency measurement suspension window 208b and inter-RAT measurement suspension windows 210b and 210c. UE 102 may thus be able to complete requisite intra-frequency measurements, inter-frequency measurements, and inter-RAT measurements concurrent to maintaining reception of MCCH data.

It is appreciated that UE 102 may continue to utilize radio measurement suspension windows in further DRX cycles, such as in order to receive MCCH data in MBSFN Area 0 MCCH window 202e and MBSFN Area 1 MCCH window 202f in the second DRX cycle of UE 102. It is appreciated that the approach detailed above is demonstrative in nature, and may be expanded in application to a number of different DRX cycle lengths with varying MCCH periodicities and temporal distributions. It is thus appreciated that MCCH data according to substantially any MCCH data period or distribution may be received during DRX cycles with substantially any period or offset utilizing the radio measurement suspension window techniques detailed above. Furthermore, it is appreciated that similar scenarios involving a different number of eMBMS data streams, such as e.g. a single eMBMS data stream or three or more eMBMS data stream, may be similarly addressed using temporary radio measurement suspensions.

As will be later detailed, identical MCCH data may be transmitted at each repetition point according to the MCCH repetition period (e.g. 32 radio frames as detailed regarding FIG. 2) during a single MCCH modification period. Accordingly, a single receiver mobile terminal receiving MCCH data may not need to receive MCCH data during every MCCH reception occasion, as the same MCCH data may be transmitted at a different MCCH reception occasion of the same MCCH modification period according to the MCCH reception period. Accordingly, it is appreciated that radio measurement suspension windows such as inter-frequency measurement suspension window 208b and inter-RAT measurement suspension windows 210b and 210c may be adapted based on whether MCCH data during a particular MCCH reception occasion is redundant with respect to previously received MCCH data. If the MCCH data is redundant, UE 102 may not execute a radio measurement suspension window, and may instead continue to perform radio measurements instead of receiving MCCH data during the MCCH reception occasion. UE 102 may be configured to determine whether MCCH data is redundant to previously received MCCH data based on control information, such MCCH modification period parameters supplied in SIB13 and MCCH information change notification occasions provided in MFSFN Radio Network Temporary Identifiers (M-RNTI).

The above-detailed strategy thus involves utilizing temporary radio measurement suspensions for single receiver UEs in order to perform radio measurements according to a DRX cycle in RRC_Idle mode while still receiving MCCH data. Due to the predictable (i.e. due to assumed periodicity) and sparse temporal distribution of MCCH data, this approach may be appropriate for scenarios where only MCCH data is being received.

However, UE 102 may additionally receive MTCH data, which may be e.g. eMBMS user data traffic containing a multimedia stream. As MTCH data may constitute a data-intensive multimedia stream, such as e.g. an audio/video television stream or an audio radio stream, such MTCH data may be comparatively unpredictable and more heavily distributed than MCCH data.

Figure 3:
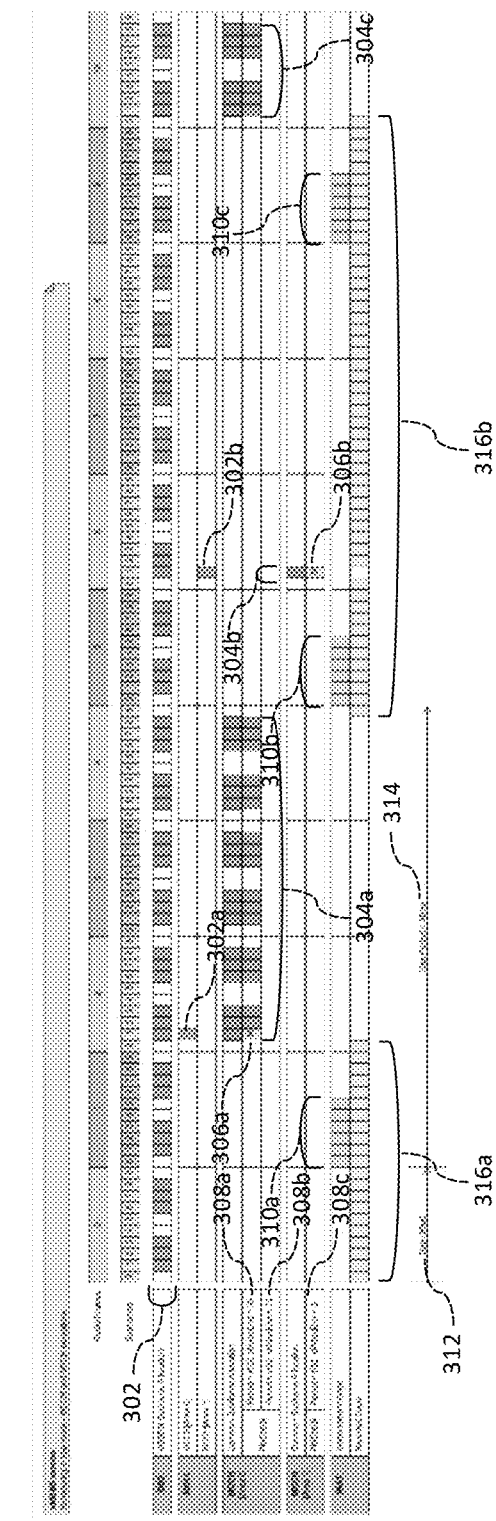
FIG. 3 shows a second exemplary radio frame sequence containing MBSFN data.

FIG. 3 shows radio frame sequence 300, which provides further detail on MCH scheduling. As will be later described, radio frame sequence 300 additionally illustrates an exemplary measurement pattern appropriate for single receiver mobile terminals, such as UE 102, in RRC_Idle mode receiving eMBMS data containing MTCH data.

Radio frame sequence 300 shows a sequence of 11 radio frames RF0-RF10. In accordance with 3GPP standards, each radio frame RF0-RF10 may contain 10 subframes, each having a 1 ms duration.

As previously indicated, certain subframes may be designated as MBSFN subframes, and accordingly may contain MCCH and/or MTCH data. The designated MBSFN subframes may be distributed amongst one or more MBSFN areas.

System Information Block 2 (SIB2) may designate which radio frames and corresponding subframes are allocated for MBSFN data to be used by all MBFSFN areas. Accordingly, SIB2 may be utilized to identify the overall set of radio frames and subframes that contain MBSFN data, and may not provide information as to which radio frames and subframes are allocated to specific MBSFN areas. As depicted in FIG. 3, SIB2 may specify MBSFN subframe allocation 302 as the relevant allocation of MBSFN subframes.

Accordingly, subframes 1, 2, 3, 6, 7, and 8 in each of radio frames RF0-RF10 may be designated as MBSFN subframes, where subframes 1, 2, 3, 6, 7, and 8 may correspond to the maximum allotment of six MBSFN subframes per radio frame. Accordingly, MBSFN Area 0 and MBSFN Area 1 may each utilize a subset of the subframes indicated by MBSFN subframe allocation 302 to transmit corresponding MCH data (i.e. MCCH and/or MTCH data).

As detailed regarding FIG. 2, UE 102 may receive SIB13, which may contain information that specifically addresses individual MBSFN areas. Accordingly, UE 102 may receive SIB13 from the first cell of eNB 104, which may provide UE 102 with information detailing the MCCH data for each of MBSFN Area 0 and MBSFN Area 1, such as the MCCH repetition period, MCCH offset, and MCCH subframe location for each of MBSFN Area 0 MCCH data and MBSFN Area 1 MCCH data. UE 102 may identify MBSFN Area 0 MCCH window 302a and MBSFN Area 1 MCCH window 302b based on the information provided in SIB13, which may occur in subframe 1 of RF2 and subframe 1 of RF6, respectively. It is appreciated that while only one subframe of MCCH data for MBSFN Area 0 and MBSFN Area 1 are depicted in FIG. 3, further subframes of MCCH data for MBSFN Area 0 and MBSFN Area 1 may occur at subframes following RF10, such as e.g. at subframes in radio frames RF34 and RF38 according to an MCCH repetition period of rf32 frames as depicted in FIG. 2.

The MCCH data for each MBSFN area may include an MBSFNAreaConfiguration message unique to each MBSFN area, which may provide information specifying a Common Subframe Allocation (CSA) and MCH Scheduling Period (MSP). The CSA may identify a pattern of MBSFN subframes that contain MCH data part of the corresponding MBSFN area. As depicted in radio frame sequence 300, the MCCH data associated with each of MBSFN Area 0 and MBSFN Area 1 may identify MBSFN Area 0 CSA 304a and MBSFN Area 1 CSA 304b, which may be located in radio frames RF2-RF4 and RF6, respectively. It appreciated that CSAs may be periodic according to a CSA period, such as e.g. indicated by MBSFN Area 0 CSA 304c, and accordingly MBSFN Area 0 CSA 304a and MBSFN Area 1 CSA 304b may repeat over time following RF10 as shown in FIG. 3.

The MSP associated with of MBSFN Area 0 and MBSFN Area 1 may be critical to successful reception of all MCH data. The MSP may specify the period at which MCH Scheduling Information (MSI) is transmitted, which may specify the exact MBSFN subframes in the next MSP that contain relevant MTCH. Accordingly, MSI may be required by UE 102 in order to receive MTCH data for each of MBSFN Area 0 and MBSFN Area 1. UE 102 may not have knowledge of which MBSFN subframes contain the related MTCH data without the MSI.

UE 102 may therefore determine the MBSFN Area 0 MSP and MBSFN Area 1 MSP from the MBSFNAreaConfiguration message unique to each MBSFN area contained in the MCCH data. As specified by 3GPP, the first subframe of the MSP may contain the related MSI, and UE 102 may therefore identify MBSFN Area 0 MSI 306a and MBSFN Area 1 MSI 306b, which may be located in the first subframes of MBSFN Area 0 CSA 304a and MBSFN Area 1 CSA 304b, respectively.

Each MBSFN area MSI may specify the schedule of MTCH data in the upcoming MSP, and accordingly UE 102 may determine the schedule for MTCH data for both MBSFN Area 0 and MBSFN Area 1 using the associated MBSFN area MSI.

As shown in FIG. 3, MBSFN Area 0 CSA 304*a* may contain a large amount of MTCH data on an associated Physical MCH (PMCH), such as PMCH 308 identified in FIG. 3, which is characterized by period r32 and parameter sfAllocEnd=35 where sfAllocEnd is a parameter referring to the last subframe allocated to PMCH 308 within the CSA. Accordingly, in order to effectively receive the first eMBMS stream associated with MBSFN Area 0, 403 UE 102 may need to receive a large amount MTCH data over PMCH 308. UE 102 may first receive MBSFN Area 0 MSI 306*a* in order to determine the corresponding subframes containing MTCH in PMCH 308 and proceed to receive the indicated MTCH at the corresponding times.

As further shown in FIG. 3, PMCH 308 may be the only PMCH containing significant MTCH data during radio frames RF0-RF10. For example, PMCH 308*b* also associated with MBSFN Area 0 may not provide any MTCH data, while PMCH 308*c* associated with MBSFN Area 1 may only provide MBSFN Area 1 MSI 306*b* during RF6. PMCH 308*c* may not contain any further MTCH data, and accordingly MBSFN Area 1 MSI 306*b* may indicate that no further MTCH data is scheduled during at least RF6-RF10. It is appreciated that the above-detailed MCH data scheduling including MSI, MCCH, and MTCH is exemplary in nature, and that the principles of this disclosure may be expanded to address substantially any MCH schedule.

UE 102 may thus be required to receive a variety of MCH data including MSI, MCCH, and MTCH, corresponding to MBSFN Area 0 MCCH window 302*a* and MBSFN Area 1 MCCH window 302*b* MBSFN Area 0 CSA 304*a* and MBSFN Area 1 CSA 304*b*, MBSFN Area 0 MSI 306*a*, MBSFN Area 1 MSI 306*b*, and MTCH data on PMCH 308*a* and 308*c* in FIG. 3. While reception of MCCH data may continue to be periodic and sparsely distributed, periodic reception of MSI may indicate MTCH scheduling, which may be relatively unpredictable over large time windows, i.e. may only be predictable for the current MSP upon receipt of the corresponding MSI.

As a result, the approach detailed with respect to FIG. 2 regarding the use of temporary measurement suspension windows may not be appropriate for mobile terminals that are receiving MTCH data during RCC_Idle mode DRX measurements. For example, inter-frequency measurement window 208*a* and inter-RAT measurement window 210*a* as depicted in radio frame sequence 200 may span for e.g. 6 or 53 radio frames, respectively. However, as depicted by radio frame sequence 300, one or more PMCH may be heavily active with MTCH data over multiple consecutive radio frames, where each radio frame may contain up to 6 MBSFN subframes containing MTCH data for a single MBSFN area. Accordingly, the 10 ms (i.e. length of one radio frame) measurement suspension windows 208*b*, 210*b*, and 210*c* may result in the loss of significant MTCH data. Additionally, the presence of MTCH data may be so heavily distributed as to require excessively frequent measurement suspension windows, i.e. every few radio frames, thereby leading to large significant disruption of inter-frequency and inter-RAT measurements.

Accordingly, it may not be possible to complete both inter-frequency and inter-RAT measurements and reception of MTCH data at an acceptable level by applying temporary measurement suspension windows such as done in radio frame sequence 200. The existing default procedure of DRX measurements in RRC_Idle mode may be even more undesirable, as substantially all eMBMS data may be lost during inter-frequency and inter-RAT measurement windows.

Instead, a single receive mobile terminal in RRC_Idle mode may apply a measurement gap pattern similar to the measurement gap patterns applied for inter-frequency and inter-RAT measurements in RRC_Connected mode. For example, a single receiver mobile terminal receiving MTCH data (in addition to MCCH data) may schedule periodic gaps during which to suspend reception of MTCH data in order to perform inter-frequency and inter-RAT measurements.

In RRC_Connected mode, a single receiver mobile terminal may implement 6 ms gaps according to a 40 or 80 ms period. During each of these 6 ms measurement gaps, the mobile terminal may suspend reception of downlink data in order to perform inter-frequency and inter-RAT measurements, after which the mobile terminal may return to reception of downlink data. The schedule of the measurement gaps, i.e. the measurement gap pattern, may be controlled by the mobile communication network, and may be further implemented in such a manner that a serving cell likewise suspends transmission of downlink data to the mobile terminal during the scheduled measurement gaps. In this manner the mobile terminal may not experience excessive data loss. While data rates may exhibit slight decreases due to the suspensions in downlink reception, a single receiver mobile terminal may be able to perform continuous downlink reception in addition to inter-frequency and inter-RAT measurements.

Accordingly, a single receiver mobile terminal in RRC_Idle mode receiving an eMBMS data stream including MTCH data may implement similar measurement gaps, which may be applied as gaps in reception of eMBMS data. The mobile terminal may then perform any requisite inter-frequency and inter-RAT measurements during the measurement gaps before returning to reception of eMBMS data. It is appreciated that intra-frequency measurements may be performed concurrent to reception of eMBMS data (i.e. including MTCH data) without substantial receiver adjustment, i.e. similarly to the scenario detailed above regarding the reception of only MCCH data.

A single receiver mobile terminal receiving MTCH data may therefore implement a measurement gap pattern similar to as utilized in RRC_Connected mode in order to receive MTCH data concurrent to performing inter-frequency and inter-RAT measurements in RRC_Idle mode. The gap offset, periodicity, and length may be selected and/or adjusted in order to ensure that a maximum amount of MTCH data is received while still performing inter-frequency and inter-RAT measurements of requisite quality. For example, a mobile terminal may determine an appropriate gap offset (i.e. gap starting point) and gap periodicity based on MCH scheduling parameters, such as MCCH data, MTCH data, and MSI, and may attempt to determine a measurement gap pattern in order to prioritize reception of MCH data.

Identification of a measurement gap pattern for inter-frequency and inter-RAT measurements in RRC_Idle may allow for reception of all or substantially all eMBMS data, even in the event of heavy MTCH traffic. As MTCH data may be encoded in a redundant correction manner, decoders at a mobile terminal may be able to compensate for certain gaps during which MTCH data is lost while performing inter-frequency and inter-RAT measurements.

Accordingly, mobile terminal 102 may schedule a measurement gap pattern with relatively short (e.g. 6 ms) measurement gaps with a set period (e.g. 40 or 80 ms) during which reception of eMBMS data may be suspended in order to perform inter-frequency and inter-RAT measurements. Mobile terminal 102 may implement such a measurement gap pattern when an eMBMS data stream contains MTCH data, as such MTCH data may be largely unpredictable and heavily distributed in time. Mobile terminal 102 may additionally utilize temporary measurement suspension windows in scenarios where an eMBMS data stream does not contain MTCH data, such as the scenario detailed regarding FIG. 2 in which only MCCH data is present.

For example, UE 102 may implement measurement gaps 310*a*, 310*b*, and 310*c* as shown in FIG. 3, during which UE 102 may perform inter-frequency and inter-RAT measurements. UE 102 may execute measurement gaps 310*a*, 310*b*, and 310*c* according to a specific gap offset and gap period, such as gap offset 312 and gap period 314. Gap offset 312 may determine an initialization point for the measurement gaps according to gap period 314.

UE 102 may then perform requisite inter-frequency and inter-RAT measurements during measurement gaps 310*a*, 310*b*, and 310*c*, and may report resulting inter-frequency and inter-RAT measurements corresponding to reported gaps 316*a* and 316*b*.

As previously indicated, it may be practical for UE 102 to select a measurement gap length of 6 ms with a gap period of 40 or 80 ms in order to maintain consistency with the measurement gap pattern implemented in RRC_Connected mode. However, it is appreciated that this aspect is demonstrative in nature, and accordingly substantially any gap length and/or gap period may be implemented.

UE 102 may then select an appropriate gap offset 312 in order to minimize collisions between measurement gaps and reception of eMBMS data. The gap offset may be selected on a subframe scale (i.e. corresponding to a 1 ms scale), such as in FIG. 3 where gap offset 312 is selected to be 1 radio frame=10 subframes=10 ms following the beginning of RF0. In this example illustrated regarding radio frame sequence 300, there may not exist any collisions between measurement gaps and eMBMS reception, as gap offset 312 has been selected in such a way that measurement gaps 310*a*, 310*b*, and 310*c* occur during time windows where no eMBMS data is received.

It is appreciated that the specific distribution of eMBMS data, in particular MTCH data, may have a significant impact on the amount of eMBMS data loss. For example, all six possible subframes (i.e. subframes 1, 2, 3, 6, 7, and 8 as specified by 3GPP, with subframes 0-9 constituting an entire radio frame) may be allocated as MBSFN subframes, such as e.g. specified by MBSFN subframe allocation 302 as shown in FIG. 3. However, UE 102 may not receive every possible eMBMS service associated with each of the allocated MBSFN subframes, and consequently there may exist windows where measurement gaps (such as e.g. measurement gaps 310*a*, 310*b*, and 310*c*) may be placed in order to avoid collisions with eMBMS data.

In the example illustrated by radio frame sequence 300, there may be no collisions as UE 102 has selected gap offset 312 such that no collisions exist.

It is further appreciated that even in the event of collisions, UE 102 may be configured to perform the measurements associated with the measurement gap instead of receiving the colliding eMBMS data. UE 102 may still be able to effectively receive the eMBMS data stream as the eMBMS data may be redundantly coded, thereby allowing for decoders in UE 102 to compensate gaps in data loss. Accordingly, even in worse case scenarios in which UE 102 must receive all possible MBSFN subframes, only two MBSFN subframes over a 40 or 80 ms gap period will collide with a measurement gap. UE 102 may nevertheless be able to compensate for such small reception gaps in decoding.

UE 102 may be configured to select gap offset 312, and may do so in such a way that collisions between measurement gaps and eMBMS data reception is reduced.

Accordingly, UE 102 may maintain high reception quality of one or more eMBMS data streams while performing requisite inter-frequency and inter-RAT measurements to satisfy measurement performance requirements in RRC_Idle mode by using a periodic measurement gap pattern with relatively short measurement gaps, such as e.g. a 40 or 80 ms period with 6 ms measurement gaps.

Operation of the measurement gap pattern may be at least in part implemented by an LTE Physical layer (LTE PHY) of a protocol stack of UE 102, such as a protocol stack executed by one or more firmware components of UE 102. Accordingly, the LTE PHY of UE 102 may be configured to define the relevant measurement gap pattern parameters, such as the gap offset, gap period, and measurement gap length.

UE 102 may prioritize the reception of certain type of eMBMS data over others, and accordingly may consider such priority when selecting a gap offset. For example, UE 102 may prioritize reception of MSI higher than reception of MCCH and MTCH. UE 102 may therefore prioritize the avoidance of collisions between measurement gaps and MSI reception occasions the highest relative to the avoidance of collisions between measurement gaps and MCCH and MTCH reception occasions. UE 102 may thus identify MSI reception occasions, such as based on the related MSP as indicated in the MBSFNAreaConfiguration message provided by MCCH data. As previously indicated, MSI may be located in the first subframe of a given MSP, and may be periodic according to the MSP. UE 102 may therefore select a gap offset on a subframe basis in order to avoid any collisions between measurement gaps and MSI reception occasions.

UE 102 may further prioritize reception of MCCH higher than reception of MTCH, and thus may prioritize avoidance of collisions between measurement gaps and MCCH reception occasions higher than avoidance of collisions between measurement gaps and MTCH reception occasions. UE 102 may therefore select a gap offset based on the MCCH repetition period, and may select the gap offset such that a MTCH reception occasions collision occurs if doing so prevents an MCCH reception occasion collision.

UE 102 may thus prioritize MTCH reception lower than MSI and MCCH reception. However, UE 102 may nevertheless attempt to select a gap offset such that a minimal amount of MTCH data is lost due to collisions with measurement gaps, such as detailed regarding FIG. 3.

It is appreciated that the reception occasions associated with additional types eMBMS data may additionally be considered. For example, due to the potentially redundant nature of MCCH data (as previously introduced regarding MCCH repetition and modification periods), UE 102 may not need to receive MCCH data during every MCCH reception occasion in a single MCCH modification period. UE 102 may be configured to monitor for M-RNTI in Physical Downlink Control Channel (PDCCH) data in order to determine if an MCCH information change is approaching, such as a change in MCCH data to be reflected in the next MCCH modification period. UE 102 may thus need to monitor PDCCH data for M-RNTI indicating an MCCH information change, which may occur at the beginning of certain subframes designated in e.g. SIB13 as MCCH information change notification occasions. UE 102 may thus be configured to consider the location of such MCCH information change notification changes in selecting a gap offset in order to ensure M-RNTI is received in the event of an MCCH information change.

Similarly, UE 102 may be configured to consider the potential redundancy of MCCH data in selecting a gap offset. For example, UE 102 may not need to receive MCCH data during each MCCH reception occasion dictated by the MCCH repetition period, and accordingly may be configured to select a gap offset that prioritizes reception of certain MCCH data as opposed to reception of all MCCH data. For example, UE 102 may only need to receive MCCH data a limited number of times per MCCH modification period, as the MCCH data may be redundant. Furthermore, MCCH data may be redundant over multiple MCCH modification periods, which may be determinable to the UE 102 by monitoring for M-RNTI potentially indicating an MCCH information change for a succeeding MCCH modification period.

Upon selecting a gap offset to utilize in conjunction with the measurement gap length (e.g. 6 ms) and gap period (e.g. 40 or 80 ms), UE 102 may utilize the selected measurement gap pattern for an extended duration of time. Although MTCH data reception occasions may vary based on scenario, MSI and MCCH reception occasions may occur in a predominantly periodic manner. UE 102 may therefore continue to perform measurement gaps using a set measurement gap pattern upon initial selection of a gap offset. This approach may be beneficial as UE 102 may need inter-RAT measurements at regularly occurring intervals, where inter-RAT measurements performed at irregular intervals may complicate mobility procedures that rely on inter-RAT measurements.

However, certain scenarios may occur that warrant adjustment of the gap offset. Adjustment of the gap offset may be tasked to the LTE PHY of UE 102, which as previously detailed may be executed by one or more firmware components of UE 102 configured to execute a protocol stack. In a first scenario, the MCCH configuration may change. For example, one of the parameters MCCH offset, MCCH modification period, or MCCH repetition period may change, where the MCCH offset indicates an initiation point where transmission of MCCH will begin according to the MCCH repetition period. Accordingly, MCCH reception occasions may be shifted given an adjustment in MCCH offset, thereby potentially requiring a corresponding adjustment in the gap offset, e.g. if the new MCCH offset results in MCCH reception occasion collisions with measurement gaps scheduled according to the current gap offset.

As previously indicated, the parameter MCCH modification period indicates a period of time in which MCCH information will remain constant. The parameter MCCH repetition period indicates the periodicity of MCCH reception occasions. Accordingly, an adjustment in MCCH modification period or MCCH repetition period may similarly require an adjustment in gap offset.

Accordingly, the protocol stack of UE 102 may suspend the inter-frequency and inter-RAT measurements of the measurement gap pattern and subsequently request LTE PHY to adapt the gap offset.

In a second scenario, the PMCH configuration may change, which may be relevant for all MTCHs of a given MBFSN area. This may occur during an active gap pattern, and as a result there may be a collision between a measurement gap and an MTCH or an MSI reception occasion. A gap offset adjustment may therefore be required. After the LTE PHY of UE 102 indicates a need for gap offset adjustment, the protocol stack of UE 102 may request LTE PHY to adapt the gap offset after suspending the inter-frequency and inter-RAT measurements.

In a third scenario, the number of active MTCHs may change, such as e.g. by increasing. Increased collisions between MBSFN subframes and measurement gaps may occur due to the newly elevated amount of MTCH traffic. Similarly, the LTE PHY may indicate the need to adjust the gap offset. The protocol stack may complete the current gap period of measurement gaps and subsequently request that LTE PHY adjust the gap offset.

LTE PHY of UE 102 may only request gap offset adjustment if an adjustment can reduce the number of collisions, or can reduce the number of collisions according to a priority of reception occasion collisions relative to MSI, MCCH, and MTCH reception occasions.

Accordingly, a mobile terminal may substantially improve eMBMS reception during the performance of RRC_Idle DRX measurements by adopting a measurement gap pattern using relatively short, periodic measurement gaps, such as e.g. similar to as implemented in RRC_Connected mode. The mobile terminal may implement such a measurement gap pattern when a desired eMBMS stream contains MTCH data. In scenarios where the eMBMS stream contains only MCCH data, the mobile terminal may utilize temporary measurement suspensions in order to suspend inter-frequency and inter-RAT measurements to receive MCCH data.

Although such an approach may not be able to avoid collisions between eMBMS reception occasions (i.e. MSI, MCCH, and MTCH) in every scenario, significant benefits over conventional RRC_Idle DRX measurements, characterized by extensive continuous durations dedicated to inter-frequency and inter-RAT measurements, may be realized. In particular, default RRC_Idle DRX measurement scheduling may result in multiple consecutive reception occasions of eMBMS data being lost in a row during the performance of inter-frequency and inter-RAT measurements. In contrast, the use of relatively short periodic measurement gaps as detailed herein regarding FIG. 3 will result in a more desirable distribution of shorter windows of lost eMBMS data, which may be compensated by decoders or result in a less significant negative impact on eMBMS quality of service extended gaps.

Furthermore, certain scenarios may allow for the application of measurement gap patterns in RRC_Idle mode to facilitate reception of all eMBMS data, and accordingly may result in substantially no data loss such as detailed regarding radio frame sequence 300. Such results may be obtained in many scenarios where only a few eMBMS services are activated (i.e. not all MBSFN subframes are being received), which may be a conventional use case for many users. In contrast, default RRC_Idle DRX measurements may always lead to collisions.

Additionally, the shorter gaps in eMBMS reception associated with the measurement gap patterns of radio frame sequence 300 may be allow for reception decoders to substantially compensate for eMBMS data loss. As a mobile communication network (such as mobile communication network 100) may need to provide a gap pattern for mobile terminals in RRC_Connected to receive eMBMS data concurrently with unicast data traffic, the eMBMS data may be encoded with forward error correction capable of compensating for lengthy windows data loss. As a result, eMBMS data streams may be encoded with sufficient forward error correction that allows for 6 ms data loss windows (i.e. consistent with the 6 ms measurement gap pattern of radio frame sequence 300) without substantially any eMBMS service degradation. Consequently, the measurement gap patterns detailed herein may be able to fully compensate for eMBMS data loss even during scenarios which collisions are unavoidable.

It is appreciated that LTE PHY may additionally consider the paging frame when determining a gap offset, as UE 102 may nevertheless need to continue monitoring for paging information according to an RRC_Idle mode configuration. As the paging frame may be predominantly periodic, LTE PHY may consider the location of the paging frame in a similar manner as to the largely periodic reception occasions of MSI and MCCH data.

Figure 4:
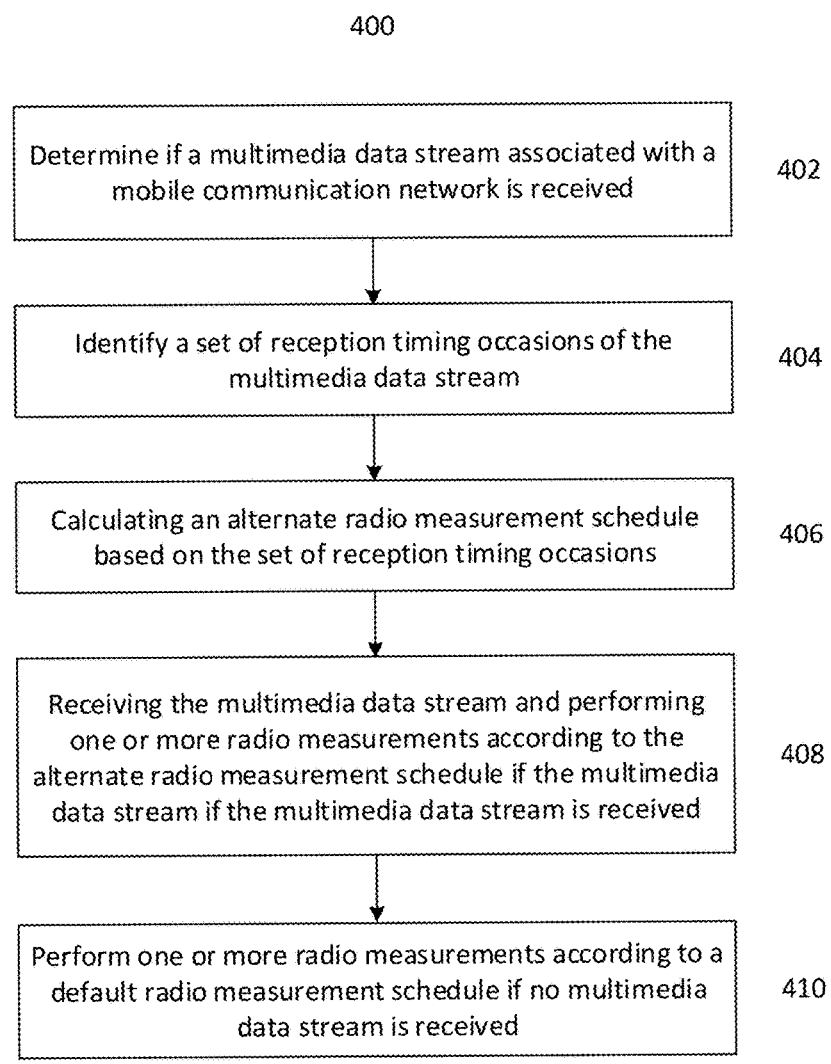
FIG. 4 shows a method of performing radio measurements.

FIG. 4 shows a flow diagram illustrating method 400, which is a method of performing radio measurements at a mobile terminal device in an idle radio connection state.

In 402, method 400 may determine if a multimedia data stream associated with a mobile communication network is being received. Method 400 may then identify a set of reception timing occasions of the multimedia data stream in 404. Method 400 may subsequently determine an alternate radio measurement schedule based on the set of reception timing occasions in 406.

In 408, method 400 may perform reception of the multimedia data stream and performing one or more radio measurements according to the alternate radio measurement schedule if the multimedia data stream if the multimedia data stream is being received. Method 400 may perform one or more radio measurements according to a default radio measurement schedule if the multimedia data stream is not being received in 410.

Method 400 may thus illustrate a process as detailed regarding FIGS. 1-3. In exemplary aspects of the disclosure, method 400 may perform additional functionality as detailed regarding the examples related to FIGS. 1-4. In particular, method 400 may be configured to perform further and/or alternate processes as detailed regarding UE 102.

Figure 5:
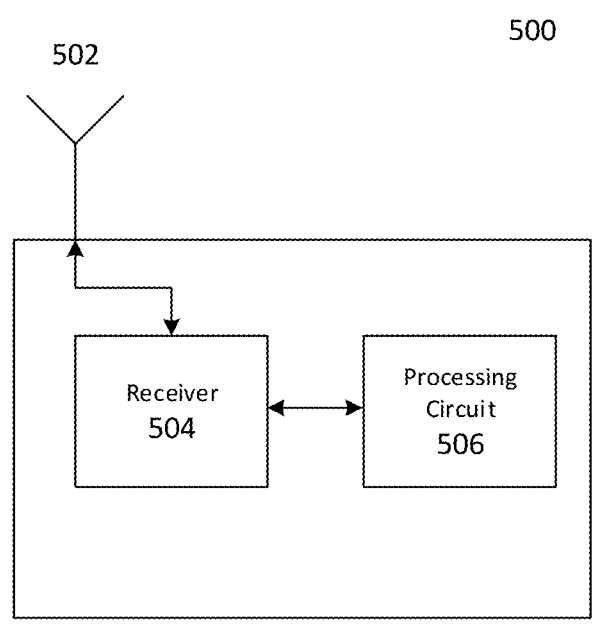
FIG. 5 shows a block diagram illustrating internal components of a mobile terminal device.

FIG. 5 shows mobile terminal device 500. Mobile terminal device 500 may include at least a receiver circuit (receiver 504) and a processing circuit (processing circuit 506).

In first exemplary aspect of the disclosure, the processing circuit may be configured to determine if a multimedia data stream associated with a mobile communication network is being received, identify a set of reception timing occasions of the multimedia data stream, and determine an alternate radio measurement schedule based on the set of reception timing occasions. The receiver circuit may be configured to perform reception of the multimedia data stream and perform one or more radio measurements according to the alternate radio measurement schedule if the multimedia data stream is being received while the mobile terminal device is in an idle radio connection state, and perform one or more radio measurements according to a default radio measurement schedule if the multimedia data stream is not being received while the mobile terminal device is in the idle radio connection state.

In a second exemplary aspect of the disclosure, mobile terminal device 500 may be configured to operate in a connected radio connection state and an idle radio connection state. The processing circuit may be configured to determine a default radio measurement schedule based on signaling received from a mobile communication network, and determine if the mobile terminal device is receiving multimedia broadcast multicast data from the mobile communication network. The receiver circuit (e.g. a measurement circuit) may be configured to perform one or more signal measurements while the mobile terminal device is in the idle radio connection state according to the default radio measurement schedule if the mobile terminal device is not receiving multimedia broadcast multicast data, and perform one or more signal measurements while the mobile terminal device is in the idle radio connection state according to an alternate radio measurement schedule if the mobile terminal device is receiving multimedia broadcast multicast data, wherein the alternate radio measurement schedule is based on timing information of the multimedia broadcast multicast data.

In a third exemplary aspect of the disclosure, the processing circuit may be configured to determine a default radio measurement schedule based on signaling received from a mobile communication network, determine if Multicast-Broadcast Single Frequency Network (MBSFN) data is being received from the mobile communication network, and determine an alternate radio measurement schedule based on one or more reception timing occasions of the MBSFN data. The receiver circuit (e.g. a measurement circuit) may be configured to perform one or more signal measurements according to the alternate radio measurement schedule if the mobile terminal device is receiving MBSFN data in a Radio Resource Control (RRC) idle state, and perform one or more signal measurements according to the default radio measurement schedule if the mobile terminal device is not receiving MBSFN data in an RRC idle state.

In further exemplary aspects of the disclosure, mobile terminal device 500 and/or processing circuit 506 may be configured to implement functionality as detailed regarding FIGS. 1-4, accordingly may perform substantially similar functionality to any related components thereof. In particular, mobile terminal device 500 may be configured to perform further and/or alternate processes as detailed regarding UE 102.

As shown in FIG. 5, mobile terminal device may further include antenna 502, which may receive and/or transmit wireless radio frequency signals. Receiver 504 may be connected with antenna 504 such that receiver 504 may control the reception and transmission of wireless radio frequency signals.

Mobile terminal device 500 may include further internal components not explicitly pictured in FIG. 5. For example, mobile terminal device 500 may further include additional components, including hardware, processors, memory, and other specialty or generic hardware/processors/circuits, etc., in order to support a variety of additional operations of wireless radio communications. Mobile terminal device 500 may include a core central processing unit (CPU), which may be configured to act as a controller for mobile terminal device 500. The core CPU may be configured to execute applications, such as e.g. applications corresponding to program code stored in a memory component of mobile terminal 500. The core CPU may also be configured to execute operations according to a protocol stack. Mobile terminal device 500 may also include a variety of user input/output devices such as displays, keypads, touchscreens, speakers, external buttons, etc. One or more of the aforementioned components of mobile terminal device 500, in particular hardware circuitry, may be integrated as part of a single chip and/or circuit.

The following examples pertain to further aspects of the disclosure:

Example 1 is a mobile terminal device. The mobile terminal device includes a processing circuit configured to determine if a multimedia data stream associated with a mobile communication network is being received, identify a set of reception timing occasions of the multimedia data stream, and determine an alternate radio measurement schedule based on the set of reception timing occasions, and a receiver circuit configured to perform reception of the multimedia data stream and perform one or more radio measurements according to the alternate radio measurement schedule if the multimedia data stream is being received while the mobile terminal device is in an idle radio connection state, and perform one or more radio measurements according to a default radio measurement schedule if the multimedia data stream is not being received while the mobile terminal device is in the idle radio connection state.

In Example 1, the subject matter of Example 1 can optionally include wherein the alternate radio measurement schedule is periodic with a first repetition period, and wherein each repetition period of the alternate radio measurement schedule includes a measurement window and a multimedia data reception window.

In Example 3, the subject matter of Example 2 can optionally include wherein the receiver circuit is configured to perform reception of the multimedia data stream and perform one or more radio measurements according to the alternate radio measurement schedule by performing one or more radio measurements during the measurement window of each repetition period of the alternate radio measurement schedule, and performing reception of the multimedia data stream during the multimedia data reception window of each repetition period of the alternate radio measurement schedule.

In Example 4, the subject matter of Example 2 can optionally include wherein the first repetition period is 40 or 80 milliseconds, and wherein the measurement window of each repetition period of the alternate radio measurement schedule is 6 milliseconds in duration.

In Example 5, the subject matter of Example 2 can optionally include wherein the default radio measurement schedule is periodic with a second repetition period, and wherein the first repetition period is less than the second repetition period.

In Example 6, the subject matter of Example 2 can optionally include wherein the default radio measurement schedule is periodic with a second repetition period, and wherein each repetition period of the default radio measurement schedule includes a measurement window.

In Example 7, the subject matter of Example 6 can optionally include wherein the duration of the measurement window of each repetition period of the default radio measurement schedule is greater than the duration of the measurement window of each reception period of the alternate radio measurement schedule.

In Example 8, the subject matter of Example 6 can optionally include wherein each repetition period of the default radio measurement schedule further includes a paging information reception window In Example 9, the subject matter of Example 6 can optionally include wherein the measurement window of each repetition period of the default radio measurement schedule includes one or more intra-frequency, inter-frequency, or inter-radio access technology (inter-RAT) radio measurements.

In Example 10, the subject matter of Example 2 can optionally include wherein the processing circuit is configured to determine an alternate radio measurement schedule based on the set of reception timing occasions by selecting an offset time point to initiate the alternate radio measurement schedule based on the set of reception timing occasions.

In Example 11, the subject matter of Example 1 can optionally include wherein the alternate radio measurement schedule includes one or more first radio measurement windows and the default radio measurement schedule includes one or more second radio measurement windows, and wherein the processing circuit is configured to determine an alternate radio measurement schedule based on the set of reception timing occasions such that the one or more first radio measurement windows collide with fewer of the set of reception timing occasions than the one or more second radio measurement windows.

In Example 12, the subject matter of any one of Examples 1 to 11 can optionally include wherein the receiver circuit is further configured to perform reception of unicast data traffic from the mobile communication network, and wherein the multimedia data stream utilizes the same wireless resources as the unicast data traffic.

In Example 13, the subject matter of any one of Examples 1 to 12 can optionally include wherein the processing circuit is configured to determine the default radio measurement schedule based on control signalling received from the mobile communication network.

In Example 14, the subject matter of any one of Examples 1 to 13 can optionally include wherein the one or more radio measurements include inter-frequency radio measurements or inter-radio access technology (inter-RAT) measurements.

In Example 15, the subject matter of Example 1 can optionally include wherein the alternate radio measurement schedule is periodic according to a first repetition period.

In Example 16, the subject matter of Example 15 can optionally include wherein the default radio measurement schedule is periodic according to a second repetition period, and wherein the first repetition period is less than the second repetition period.

In Example 17, the subject matter of any one of Examples 1 to 16 can optionally include wherein the alternate radio measurement schedule has a repetition period of 40 or 80 ms.

In Example 18, the subject matter of Example 1 can optionally include wherein the alternate radio measurement schedule is periodic with a first repetition period and includes a periodic measurement window, and wherein the receiver circuit is configured to perform reception of the multimedia data stream and perform one or more radio measurements according to the alternate radio measurement schedule by performing one or more radio measurements during the periodic measurement window, and performing reception of the multimedia data stream during the remaining time of the first repetition period.

In Example 19, the subject matter of any one of Examples 1 to 18 can optionally include wherein one or more reception timing occasions of the set of reception timing occasions are periodic.

In Example 20, the subject matter of any one of Examples 1 to 19 can optionally include wherein the multimedia data stream is a Multicast-Broadcast Single Frequency Network data stream.

In Example 21, the subject matter of Example 20 can optionally include wherein the multimedia data stream is an enhanced Multimedia Broadcast Multicast Service (eM-BMS) data stream.

In Example 22, the subject matter of Example 1 can optionally include wherein the multimedia data stream utilizes the same wireless resources as unicast data traffic.

In Example 23, the subject matter of any one of Examples 1 to 22 can optionally include wherein the default radio measurement schedule is a discontinuous reception (DRX) cycle measurement pattern.

In Example 24, the subject matter of Example 23 can optionally include wherein the receiver circuit is further configured to determine the default radio measurement schedule based on control signalling received from the mobile radio communication network.

In Example 25, the subject matter of any one of Examples 1 to 24 can optionally include wherein the mobile terminal does not have a dedicated uplink channel while in the idle radio connection state.

In Example 26, the subject matter of Example 25 can optionally include wherein the idle radio connection state is Radio Resource Control (RRC) Idle.

In Example 27, the subject matter of Example 1 can optionally include wherein the processing circuit configured to determine an alternate radio measurement schedule based on the set of reception timing occasions by identifying one or more periodically occurring subframes corresponding to the set of reception timing occasions, and selecting an offset time point to initiate the alternate radio measurement schedule based on the one or more periodically occurring subframes.

In Example 28, the subject matter of Example 27 can optionally include wherein the one or more periodically occurring subframes are designated specifically for the multimedia data stream by the mobile communication network.

Example 29 is a mobile terminal device. The mobile terminal device is configured to operate in a connected radio connection state and an idle radio connection state and includes a processing circuit configured to determine a default radio measurement schedule based on signalling received from a mobile communication network, and determine if the mobile terminal device is receiving multimedia broadcast multicast data from the mobile communication network, and a measurement circuit configured to perform one or more signal measurements while the mobile terminal device is in the idle radio connection state according to the default radio measurement schedule if the mobile terminal device is not receiving multimedia broadcast multicast data, and perform one or more signal measurements while the mobile terminal device is in the idle radio connection state according to an alternate radio measurement schedule if the mobile terminal device is receiving multimedia broadcast multicast data, wherein the alternate radio measurement schedule is based on timing information of the multimedia broadcast multicast data.

In Example 30, the subject matter of Example 29 can optionally include wherein the alternate radio measurement schedule is periodic with a first repetition period, and wherein each repetition period of the alternate radio measurement schedule includes a measurement window and a multimedia data reception window.

In Example 31, the subject matter of Example 30 can optionally include wherein the first repetition period is 40 or 80 milliseconds, and wherein the measurement window of each repetition period of the alternate radio measurement schedule is 6 milliseconds in duration.

In Example 32, the subject matter of Example 30 can optionally include wherein the measurement circuit is configured to perform one or more signal measurements while the mobile terminal device is in an idle state according to an alternate radio measurement schedule if the mobile terminal device is receiving multimedia broadcast multicast data by performing one or more signal measurements during the measurement window of each repetition period of the alternate radio measurement schedule.

In Example 33, the subject matter of Example 32 can optionally include wherein the measurement circuit is configured to perform one or more signal measurements only during the measurement window of each repetition period of the alternate radio measurement schedule.

In Example 34, the subject matter of Example 33 can optionally include wherein the mobile terminal device is configured to receive the multimedia broadcast multicast data during the multimedia data reception window of each repetition period of the alternate radio measurement schedule.

In Example 35, the subject matter of Example 30 can optionally include wherein the default radio measurement schedule is periodic with a second repetition period, and wherein each repetition period of the default radio measurement schedule includes a measurement window.

In Example 36, the subject matter of Example 35 can optionally include wherein the duration of the measurement window of each repetition period of the default radio measurement schedule is greater than the duration of the measurement window of each reception period of the alternate radio measurement schedule.

In Example 37, the subject matter of Example 35 can optionally include wherein each repetition period of the default radio measurement schedule further includes a paging information reception window In Example 38, the subject matter of Example 35 can optionally include wherein the measurement window of each repetition period of the default radio measurement schedule includes one or more intra-frequency, inter-frequency, or inter-radio access technology (inter-RAT) radio measurements.

In Example 39, the subject matter of Example 29 can optionally include wherein the processing circuit is further configured to determine the alternate radio measurement schedule based on the timing information of the multimedia broadcast multicast data.

In Example 40, the subject matter of Example 29 can optionally include wherein the processing circuit configured to determine the alternate radio measurement schedule based on the timing information of the multimedia broadcast multicast data by identifying one or more periodically occurring subframes corresponding to the multimedia broadcast multicast data, and selecting an offset time point to initiate the alternate radio measurement schedule based on the one or more periodically occurring subframes.

In Example 41, the subject matter of any one of Examples 29 to 40 can optionally include wherein the one or more periodically occurring subframes are designated specifically for the multimedia broadcast multicast data by the mobile communication network.

In Example 42, the subject matter of Example 39 can optionally include wherein the processing circuit is configured to determine the alternate radio measurement schedule based on the timing information of the multimedia broadcast multicast data by selecting an offset time point to initiate the alternate radio measurement schedule based on the timing information of the multimedia broadcast multicast data.

In Example 43, the subject matter of Example 39 can optionally include wherein the alternate radio measurement schedule includes one or more first radio measurement windows and the default radio measurement schedule includes one or more second radio measurement windows, and wherein the processing circuit is configured to determine the alternate radio measurement schedule based on the timing information of the multimedia broadcast multicast data such that the one or more first radio measurement windows collide with fewer reception timing occasions of the multimedia broadcast multicast data than the one or more second radio measurement windows.

In Example 44, the subject matter of Example 29 can optionally include wherein the mobile terminal device is configured to perform reception of unicast data traffic from the mobile communication network, and wherein the multimedia broadcast multicast data stream utilizes the same wireless resources as the unicast data traffic.

In Example 45, the subject matter of any one of Examples 29 to 44 can optionally include wherein the one or more signal measurements include inter-frequency radio measurements or inter-radio access technology (inter-RAT) measurements.

In Example 46, the subject matter of Example 29 can optionally include wherein the alternate radio measurement schedule is periodic according a first repetition period.

In Example 47, the subject matter of Example 46 can optionally include wherein the default radio measurement schedule is periodic according to a second repetition period, and wherein the first repetition period is less than the second repetition period.

In Example 48, the subject matter of any one of Examples 29 to 47 can optionally include wherein the alternate radio measurement schedule has a repetition period of 40 or 80 ms.

In Example 49, the subject matter of any one of Examples 29 to 48 can optionally include wherein the multimedia broadcast multicast data is Multicast-Broadcast Single Frequency Network data.

In Example 50, the subject matter of any one of Examples 29 to 49 can optionally include wherein the multimedia broadcast multicast data is enhanced Multimedia Broadcast Multicast Service data.

In Example 51, the subject matter of any one of Examples 29 to 50 can optionally include wherein the multimedia broadcast multicast data utilizes the same wireless resources as unicast data traffic.

In Example 52, the subject matter of any one of Examples 29 to 51 can optionally include wherein the default radio measurement schedule is a discontinuous reception (DRX) cycle measurement pattern.

In Example 53, the subject matter of any one of Examples 29 to 52 can optionally include wherein the mobile terminal does not have a dedicated uplink channel while in the idle radio connection state.

In Example 54, the subject matter of Example 53 can optionally include wherein the idle radio connection state is Radio Resource Control (RRC) Idle.

Example 55 is a mobile terminal device. The mobile terminal device includes a processing circuit configured to determine a default radio measurement schedule based on signalling received from a mobile communication network, determine if Multicast-Broadcast Single Frequency Network (MBSFN) data is being received from the mobile communication network, and determine an alternate radio measurement schedule based on one or more reception timing occasions of the MBSFN data, and a measurement circuit configured to perform one or more signal measurements according to the alternate radio measurement schedule if the mobile terminal device is receiving MBSFN data in a Radio Resource Control (RRC) idle state, and perform one or more signal measurements according to the default radio measurement schedule if the mobile terminal device is not receiving MBSFN data in an RRC idle state.

In Example 56, the subject matter of Example 55 can optionally include wherein the default radio measurement schedule is a discontinuous reception (DRX) cycle measurement schedule.

In Example 57, the subject matter of Example 55 can optionally include wherein the default radio measurement schedule includes one or more measurement windows, and wherein the processing circuit is configured to determine an alternate radio measurement schedule based on timing information of the MSFN data by scheduling a measurement suspension window during which radio measurements are to be suspended in a first measurement window of the one or more measurement windows of the default radio measurement schedule if the MBSFN data does not include MBSFN traffic data to generate the alternate radio measurement schedule.

In Example 58, the subject matter of Example 57 can optionally include wherein the processing circuit is configured to schedule a measurement suspension window in a first measurement window of the one or more measurement windows of the default radio measurement schedule by scheduling the measurement suspension window during a reception timing occasion of the MBSFN data.

In Example 59, the subject matter of Example 57 can optionally include wherein the processing circuit is configured to determine an alternate radio measurement schedule based on timing information of the MSFN data by selecting a periodic radio measurement schedule if the MBSFN data includes MBSFN traffic data to generate the alternate radio measurement schedule, wherein the alternate radio measurement schedule is different from the default measurement schedule.

In Example 60, the subject matter of Example 55 can optionally include wherein the wherein the alternate radio measurement schedule is periodic with a first repetition period, and wherein each repetition period of the alternate radio measurement schedule includes a measurement window and a multimedia data reception window.

In Example 61, the subject matter of Example 60 can optionally include wherein the measurement circuit is configured to perform one or more signal measurements according to the alternate radio measurement schedule if the mobile terminal device is receiving MBSFN data in a Radio Resource Control (RRC) idle state by performing one or more signal measurements during the measurement window of each repetition period of the alternate radio measurement schedule.

In Example 62, the subject matter of Example 61 can optionally include wherein the measurement circuit is further configured to perform one or more signal measurements according to the alternate radio measurement schedule if the mobile terminal device is receiving MBSFN data in a Radio Resource Control (RRC) idle state by performing one or more signal measurements only during the measurement window of each repetition period of the alternate radio measurement schedule.

In Example 63, the subject matter of Example 60 can optionally include wherein the first repetition period is 40 or 80 milliseconds, and wherein the measurement window of each repetition period of the alternate radio measurement schedule is 6 milliseconds in duration.

In Example 64, the subject matter of Example 60 can optionally include wherein the default radio measurement schedule is periodic with a second repetition period, and wherein the first repetition period is less than the second repetition period.

In Example 65, the subject matter of Example 60 can optionally include wherein the duration of the measurement window of each repetition period of the default radio measurement schedule is greater than the duration of the measurement window of each reception period of the alternate radio measurement schedule.

In Example 66, the subject matter of Example 65 can optionally include wherein each repetition period of the default radio measurement schedule further includes a paging information reception window In Example 67, the subject matter of Example 65 can optionally include wherein the measurement window of each repetition period of the default radio measurement schedule includes one or more intra-frequency, inter-frequency, or inter-radio access technology (inter-RAT) radio measurements.

In Example 68, the subject matter of Example 60 can optionally include wherein the processing circuit is configured to determine an alternate radio measurement schedule based on one or more reception timing occasions of the MBSFN data by selecting an offset time point to initiate the alternate radio measurement schedule based on the set of reception timing occasions.

In Example 69, the subject matter of Example 55 can optionally include wherein the alternate radio measurement schedule includes one or more first radio measurement windows and the default radio measurement schedule includes one or more second radio measurement windows, and wherein the processing circuit is configured to determine an alternate radio measurement schedule based on one or more reception timing occasions of the MBSFN data such that the one or more first radio measurement windows collide with fewer of the set of reception timing occasions of the MBSFN data than the one or more second radio measurement windows.

In Example 70, the subject matter of any one of Examples 55 to 69 can optionally include wherein the mobile terminal device is further configured to perform reception of unicast data traffic from the mobile communication network, and wherein the MBSFN data utilizes the same wireless resources as the unicast data traffic.

In Example 71, the subject matter of any one of Examples 55 to 70 can optionally include wherein the one or more signal measurements include inter-frequency radio measurements or inter-radio access technology (inter-RAT) measurements.

In Example 72, the subject matter of Example 55 can optionally include wherein the alternate radio measurement schedule is periodic according to a first repetition period.

In Example 73, the subject matter of Example 72 can optionally include wherein the default radio measurement schedule is periodic according to a second repetition period, and wherein the first repetition period is less than the second repetition period.

In Example 74, the subject matter of any one of Examples 55 to 73 can optionally include wherein the alternate radio measurement schedule has a repetition period of 40 or 80 ms.

In Example 75, the subject matter of Example 55 can optionally include wherein the alternate radio measurement schedule is periodic with a first repetition period and includes a periodic measurement window, and wherein the measurement circuit is configured to perform one or more signal measurements according to the alternate radio measurement schedule by performing one or more radio measurements during the periodic measurement window, and performing reception of the multimedia data stream during the remaining time of the first repetition period.

In Example 76, the subject matter of any one of Examples 55 to 75 can optionally include wherein the one or more reception timing occasions of the MBSFN data are periodic.

In Example 77, the subject matter of any one of Examples 55 to 76 can optionally include wherein the MBSFN data is enhanced Multimedia Broadcast Multicast Service (eMBMS) data.

In Example 78, the subject matter of any one of Examples 55 to 77 can optionally include wherein the default radio measurement schedule is a discontinuous reception (DRX) cycle measurement pattern.

In Example 79, the subject matter of Example 55 can optionally include wherein the processing circuit is configured to determine an alternate radio measurement schedule based on one or more reception timing occasions of the MBSFN data by identifying one or more periodically occurring subframes corresponding to one or more reception timing occasions of the MBSFN data, and selecting an offset time point to initiate the alternate radio measurement schedule based on the one or more periodically occurring subframes.

In Example 80, the subject matter of Example 79 can optionally include wherein the one or more periodically occurring subframes are designated specifically for the multimedia data stream by the mobile communication network.

Example 81 is a method of performing radio measurements at a mobile terminal device in an idle radio connection state. The method includes determining if a multimedia data stream associated with a mobile communication network is being received, identifying a set of reception timing occasions of the multimedia data stream, determining an alternate radio measurement schedule based on the set of reception timing occasions, performing reception of the multimedia data stream and performing one or more radio measurements according to the alternate radio measurement schedule if the multimedia data stream if the multimedia data stream is being received, and performing one or more radio measurements according to a default radio measurement schedule if the multimedia data stream is not being received.

In Example 82, the subject matter of Example 81 can optionally include wherein the alternate radio measurement schedule is periodic with a first repetition period, and wherein each repetition period of the alternate radio measurement schedule includes a measurement window and a multimedia data reception window.

In Example 83, the subject matter of Example 82 can optionally include wherein the performing reception of the multimedia data stream and performing one or more radio measurements according to the alternate radio measurement schedule if the multimedia data stream if the multimedia data stream is being received includes performing one or more radio measurements during the measurement window of each repetition period of the alternate radio measurement schedule, and performing reception of the multimedia data stream during the multimedia data reception window of each repetition period of the alternate radio measurement schedule.

In Example 84, the subject matter of Example claim can optionally include, wherein the first repetition period is 40 or 80 milliseconds, and wherein the measurement window of each repetition period of the alternate radio measurement schedule is 6 milliseconds in duration.

In Example 85, the subject matter of Example 82 can optionally include wherein the default radio measurement schedule is periodic with a second repetition period, and wherein the first repetition period is less than the second repetition period.

In Example 86, the subject matter of Example 82 can optionally include wherein the default radio measurement schedule is periodic with a second repetition period, and wherein each repetition period of the default radio measurement schedule includes a measurement window.

In Example 87, the subject matter of Example 86 can optionally include wherein the duration of the measurement window of each repetition period of the default radio measurement schedule is greater than the duration of the measurement window of each reception period of the alternate radio measurement schedule.

In Example 88, the subject matter of Example 86 can optionally include wherein each repetition period of the default radio measurement schedule further includes a paging information reception window In Example 89, the subject matter of Example 88 can optionally include wherein the measurement window of each repetition period of the default radio measurement schedule includes one or more intra-frequency, inter-frequency, or inter-radio access technology (inter-RAT) radio measurements.

In Example 90, the subject matter of Example 82 can optionally include wherein the determining an alternate radio measurement schedule based on the set of reception timing occasions includes selecting an offset time point to initiate the alternate radio measurement schedule based on the set of reception timing occasions.

In Example 91, the subject matter of Example 81 can optionally include wherein the alternate radio measurement schedule includes one or more first radio measurement windows and the default radio measurement schedule includes one or more second radio measurement windows, and wherein the determining an alternate radio measurement schedule based on the set of reception timing occasions includes determining an alternate radio measurement schedule based on the set of reception timing occasions such that the one or more first radio measurement windows collide with fewer of the set of reception timing occasions than the one or more second radio measurement windows.

In Example 92, the subject matter of Example 81 can optionally further include performing reception of unicast data traffic from the mobile communication network, and wherein the multimedia data stream utilizes the same wireless resources as the unicast data traffic.

In Example 93, the subject matter of any one of Examples 81 to 92 can optionally further include determining the default radio measurement schedule based on control signalling received from the mobile communication network.

In Example 94, the subject matter of any one of Examples 81 to 93 can optionally include wherein the one or more radio measurements include inter-frequency radio measurements or inter-radio access technology (inter-RAT) measurements.

In Example 95, the subject matter of Example 81 can optionally include wherein the alternate radio measurement schedule is periodic according to a first repetition period.

In Example 96, the subject matter of Example 95 can optionally include wherein the default radio measurement schedule is periodic according to a second repetition period, and wherein the first repetition period is less than the second repetition period.

In Example 97, the subject matter of any one of Examples 81 to 96 can optionally include wherein the alternate radio measurement schedule has a repetition period of 40 or 80 ms.

In Example 98, the subject matter of Example 81 can optionally include wherein the alternate radio measurement schedule is periodic with a first repetition period and includes a periodic measurement window, and wherein the performing reception of the multimedia data stream and performing one or more radio measurements according to the alternate radio measurement schedule includes performing one or more radio measurements during the periodic measurement window, and performing reception of the multimedia data stream during the remaining time of the first repetition period.

In Example 99, the subject matter of Example 81 can optionally include wherein one or more reception timing occasions of the set of reception timing occasions are periodic.

In Example 100, the subject matter of any one of Examples 81 to 99 can optionally include wherein the multimedia data stream is a Multicast-Broadcast Single Frequency Network data stream.

In Example 101, the subject matter of Example 100 can optionally include wherein the multimedia data stream is an enhanced Multimedia Broadcast Multicast Service (eM-BMS) data stream.

In Example 102, the subject matter of any one of Examples 81 to 101 can optionally include wherein the multimedia data stream utilizes the same wireless resources as unicast data traffic.

In Example 103, the subject matter of any one of Examples 81 to 102 can optionally include wherein the default radio measurement schedule is a discontinuous reception (DRX) cycle measurement pattern.

In Example 104, the subject matter of Example 103 can optionally further include determining the default radio measurement schedule based on control signalling received from the mobile radio communication network.

In Example 105, the subject matter of any one of Examples 81 to 104 can optionally include wherein the idle radio connection state is Radio Resource Control (RRC) Idle.

In Example 106, the subject matter of Example 81 can optionally include wherein the determining an alternate radio measurement schedule based on the set of reception timing occasions includes identifying one or more periodically occurring subframes corresponding to the set of reception timing occasions, and selecting an offset time point to initiate the alternate radio measurement schedule based on the one or more periodically occurring subframes.

In Example 107, the subject matter of Example 106 can optionally include wherein the one or more periodically occurring subframes are designated specifically for the multimedia data stream by the mobile communication network.

Example 107 is a mobile terminal device. The mobile terminal device includes a processing circuit and a receiver circuit. The processing circuit is configured to determine if a multimedia data stream associated with a mobile communication network is received, identify a set of reception timing occasions of the multimedia data stream, and determine an alternate radio measurement schedule based on the set of reception timing occasions. The receiver circuit is configured to receive the multimedia data stream and perform one or more radio measurements according to the alternate radio measurement schedule if the multimedia data stream is received while the mobile terminal device is in an idle radio connection state, and perform one or more radio measurements according to a default radio measurement schedule if no multimedia data stream is received while the mobile terminal device is in the idle radio connection state.

Example 108 is a mobile terminal device configured to operate in connected radio connection state and an idle radio connection state. The mobile terminal device includes a processing circuit and a measurement circuit. The processing circuit is configured to calculate a default radio measurement schedule based on signalling received from a mobile communication network, and determine if the mobile terminal device is receiving multimedia broadcast multicast data from the mobile communication network. The measurement circuit is configured to perform one or more signal measurements while the mobile terminal device is in the idle radio connection state according to the default radio measurement schedule if the mobile terminal device is not receiving multimedia broadcast multicast data, and perform one or more signal measurements while the mobile terminal device is in the idle radio connection state according to an alternate radio measurement schedule if the mobile terminal device is receiving multimedia broadcast multicast data, wherein the alternate radio measurement schedule is based on timing information of the multimedia broadcast multicast data.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising:
   a processing circuit configured to:
      determine if a multimedia data stream is received within Multicast-Broadcast Single Frequency Network (MBSFN) data;
      identify a set of reception timing occasions of the multimedia data stream; and
      determine an alternate radio measurement schedule based on at least one system information block (SIB) received at the mobile terminal device, the at least one SIB indicating the set of reception timing occasions; and
   a receiver circuit configured to:
      receive the multimedia data stream and perform one or more radio measurements according to the alternate radio measurement schedule if the multimedia data stream is received while the mobile terminal device is in an idle radio connection state; and
      perform one or more radio measurements according to a default radio measurement schedule if no multimedia data stream is received while the mobile terminal device is in the idle radio connection state.

2. The mobile terminal device of claim 1, wherein the alternate radio measurement schedule is periodic with a first repetition period, and
   wherein each repetition period of the alternate radio measurement schedule comprises a measurement window and a multimedia data reception window.

3. The mobile terminal device of claim 2, wherein the receiver circuit is configured to receive the multimedia data stream and perform one or more radio measurements according to the alternate radio measurement schedule by:
   performing one or more radio measurements during the measurement window of each repetition period of the alternate radio measurement schedule; and
   receiving the multimedia data stream during the multimedia data reception window of each repetition period of the alternate radio measurement schedule.

4. The mobile terminal device of claim 2, wherein the first repetition period is about 40 or 80 milliseconds, and
   wherein the measurement window of each repetition period of the alternate radio measurement schedule is about 6 milliseconds in duration.

5. The mobile terminal device of claim 2, wherein the default radio measurement schedule is periodic with a second repetition period, and
   wherein each repetition period of the default radio measurement schedule comprises a measurement window.

6. The mobile terminal device of claim 5, wherein the duration of the measurement window of each repetition period of the default radio measurement schedule is greater than the duration of the measurement window of each reception period of the alternate radio measurement schedule.

7. The mobile terminal device of claim 2, wherein the processing circuit is configured to determine an alternate radio measurement schedule by:
   selecting an offset time point to initiate the alternate radio measurement schedule based on the set of reception timing occasions.

8. The mobile terminal device of claim 1, wherein the alternate radio measurement schedule comprises one or more first radio measurement windows and the default radio measurement schedule comprises one or more second radio measurement windows, and
   wherein the processing circuit is configured to determine an alternate radio measurement schedule such that the one or more first radio measurement windows collide with fewer of the set of reception timing occasions than the one or more second radio measurement windows.

9. The mobile terminal device of claim 1, wherein the receiver circuit is further configured to receive unicast data traffic from a mobile communication network, and
   wherein the multimedia data stream utilizes the same wireless resources as the unicast data traffic.

10. The mobile terminal device of claim 1, wherein the processing circuit is configured to:
    determine the default radio measurement schedule based on control signaling received from a mobile communication network.

11. The mobile terminal device of claim 1, wherein the one or more radio measurements according to at least one of the alternate radio measurement schedule or the default radio measurement schedule comprise inter-frequency radio measurements or inter-radio access technology (inter-RAT) measurements.

12. A mobile terminal device configured to operate in a connected radio connection state and an idle radio connection state, the mobile terminal device comprising:
   a processing circuit configured to:
      determine a default radio measurement schedule based on signaling received from a mobile communication network, and
      determine if the mobile terminal device is receiving a multimedia data stream within Multicast-Broadcast Single Frequency Network (MBSFN) data from the mobile communication network; and a measurement circuit configured to:
perform one or more signal measurements while the mobile terminal device is in the idle radio connection state according to the default radio measurement schedule if the mobile terminal device is not receiving a multimedia data stream; and
perform one or more signal measurements while the mobile terminal device is in the idle radio connection state according to an alternate radio measurement schedule if the mobile terminal device is receiving the multimedia data stream,
wherein the alternate radio measurement schedule is based on at least one system information block (SIB) received at the mobile terminal device, the at least one SIB indicating timing information of the multimedia data stream.

13. The mobile terminal device of claim 12, wherein the alternate radio measurement schedule is periodic with a first repetition period, and
wherein each repetition period of the alternate radio measurement schedule comprises a measurement window and a multimedia data reception window.

14. A mobile terminal device comprising:
a processing circuit configured to:
determine a default radio measurement schedule based on signaling received from a mobile communication network,
determine if Multicast-Broadcast Single Frequency Network (MBSFN) data is received from the mobile communication network, and
determine an alternate radio measurement schedule based on at least one system information block (SIB) received at the mobile terminal device, the at least one SIB indicating one or more reception timing occasions of the MBSFN data; and
a measurement circuit configured to:
perform one or more signal measurements according to the alternate radio measurement schedule if MBSFN data is received while the mobile terminal device is in a Radio Resource Control (RRC) idle state; and
perform one or more signal measurements according to the default radio measurement schedule if no MBSFN data is received while the mobile terminal device is in an RRC idle state.

15. The mobile terminal device of claim 14, wherein the default radio measurement schedule is a discontinuous reception (DRX) cycle measurement schedule.

16. The mobile terminal device of claim 14, wherein the default radio measurement schedule comprises one or more measurement windows, and
wherein the processing circuit is configured to determine the alternate radio measurement schedule by:
scheduling a measurement suspension window during which radio measurements are to be suspended in a first measurement window of the one or more measurement windows of the default radio measurement schedule if the MBSFN data does not include MBSFN traffic data to generate the alternate radio measurement schedule.

17. The mobile terminal device of claim 16, wherein the processing circuit is configured to schedule a measurement suspension window in a first measurement window of the one or more measurement windows of the default radio measurement schedule by:
scheduling the measurement suspension window during a reception timing occasion of the MBSFN data.

18. The mobile terminal device of claim 16, wherein the processing circuit is configured to determine the alternate radio measurement schedule by:
selecting a periodic radio measurement schedule if the MBSFN data includes MBSFN traffic data to generate the alternate radio measurement schedule,
wherein the alternate radio measurement schedule is different from the default measurement schedule.

19. The mobile terminal device of claim 14, wherein the processing circuit is configured to determine the alternative radio measurement schedule further based on MBSFN control data received at the mobile terminal device.

20. The mobile terminal device of claim 14, wherein the measurement circuit is further configured to perform one or more intra-frequency measurements according to the default radio measurement schedule if MBSFN data is received while the mobile terminal device is in the RRC idle state.

* * * * *